(12) United States Patent  (10) Patent No.: US 8,684,404 B2
Fischer et al.  (45) Date of Patent: Apr. 1, 2014

(54) AIR BAG WITH VARIABLE VENTING

(75) Inventors: Kurt F. Fischer, Leonard, MI (US); Douglas M. Gould, Lake Orion, MI (US); Daniele Aranzulla, Essingen (DE); Martin Burkhardtsmaier, Schwaebisch Gmund (DE)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 13/612,931

(22) Filed: Sep. 13, 2012

(65) Prior Publication Data

US 2013/0026744 A1 Jan. 31, 2013

Related U.S. Application Data

(63) Continuation-in-part of application No. 13/482,004, filed on May 29, 2012, which is a continuation-in-part of application No. 13/114,349, filed on May 24, 2011, which is a continuation-in-part of application No. 12/912,800, filed on Oct. 27, 2010.

(51) Int. Cl.
*B60R 21/276* (2006.01)

(52) U.S. Cl.
USPC .......................................... 280/739; 280/743.2

(58) Field of Classification Search
USPC ............................................ 280/743.2, 739
See application file for complete search history.

(56) References Cited

U.S. PATENT DOCUMENTS

| | | | |
|---|---|---|---|
| 5,007,662 A * | 4/1991 | Abramczyk et al. ......... 280/739 |
| 5,016,913 A | 5/1991 | Nakajima et al. | |
| 5,172,933 A | 12/1992 | Strasser et al. | |
| 5,246,250 A * | 9/1993 | Wolanin et al. ............... 280/739 |
| 5,280,953 A * | 1/1994 | Wolanin et al. ............... 280/739 |
| 5,306,043 A | 4/1994 | Mihm et al. | |
| 5,350,188 A | 9/1994 | Sato et al. | |
| 5,405,166 A | 4/1995 | Rogerson | |
| 5,421,607 A | 6/1995 | Gordon | |
| 5,492,363 A | 2/1996 | Hartmeyer et al. | |
| 5,494,314 A | 2/1996 | Kriska et al. | |
| 5,603,526 A | 2/1997 | Buchanan | |
| 5,931,497 A * | 8/1999 | Fischer ...................... 280/743.1 |
| 6,056,318 A | 5/2000 | Braunschadel | |
| 6,095,557 A * | 8/2000 | Takimoto et al. ............. 280/739 |
| 6,126,196 A | 10/2000 | Zimmerman | |
| 6,139,048 A | 10/2000 | Braunschadel | |
| 6,183,003 B1 | 2/2001 | Matsuhashi | |
| 6,206,408 B1 | 3/2001 | Schneider | |
| 6,247,726 B1 | 6/2001 | Ryan et al. | |
| 6,254,130 B1 * | 7/2001 | Jayaraman et al. ........ 280/743.2 |

(Continued)

*Primary Examiner* — Nicole Verley

(74) *Attorney, Agent, or Firm* — Tarolli, Sundheim, Covell & Tummino LLP

(57) ABSTRACT

An apparatus (10) for helping to protect an occupant (20) of a vehicle (12) comprises an inflatable vehicle occupant protection device (14) inflatable between a vehicle surface (36) and the vehicle occupant. A vent (160) releases inflation fluid from the protection device (14). The vent (160) has an actuated condition and a non-actuated condition. A tether (150) has a first connection with the vent (160) and a second connection with the protection device (14). Tension on the tether (150) actuates the vent (160). The vent (160) is initially in the non-actuated condition upon initial deployment of the protection device (14). Further deployment of the protection device (14) causes the tether (150) to place the vent (160) in the actuated condition. Occupant penetration into the protection device (14) causes the tether (150) to place the vent (160) in the non-actuated condition.

25 Claims, 11 Drawing Sheets

(56) References Cited

U.S. PATENT DOCUMENTS

| | | | | |
|---|---|---|---|---|
| 6,290,257 | B1 | 9/2001 | Bunce et al. | |
| 6,371,509 | B1 | 4/2002 | Ellerbrok et al. | |
| 6,398,258 | B2 | 6/2002 | Hamada et al. | |
| 6,554,316 | B2 | 4/2003 | Schneider et al. | |
| 6,631,921 | B1 | 10/2003 | Drossler et al. | |
| 6,631,922 | B2 | 10/2003 | Hess et al. | |
| 6,648,371 | B2 | 11/2003 | Vendely et al. | |
| 6,736,426 | B2 * | 5/2004 | Winters et al. | 280/743.2 |
| 6,746,045 | B2 | 6/2004 | Short et al. | |
| 6,773,027 | B2 | 8/2004 | Bohn et al. | |
| 6,773,030 | B2 | 8/2004 | Fischer | |
| 6,832,778 | B2 | 12/2004 | Pinsenschaum et al. | |
| 6,863,304 | B2 | 3/2005 | Reiter et al. | |
| 6,869,103 | B2 * | 3/2005 | Ryan et al. | 280/743.2 |
| 6,918,613 | B2 | 7/2005 | Short et al. | |
| 6,932,385 | B2 * | 8/2005 | Hawthorn et al. | 280/739 |
| 6,971,671 | B2 | 12/2005 | Schneider et al. | |
| 6,981,719 | B2 * | 1/2006 | Igawa | 280/743.2 |
| 7,059,634 | B2 | 6/2006 | Bossecker et al. | |
| 7,083,191 | B2 | 8/2006 | Fischer | |
| 7,083,192 | B2 | 8/2006 | Fischer et al. | |
| 7,131,664 | B1 | 11/2006 | Pang et al. | |
| 7,134,691 | B2 | 11/2006 | Dunkle et al. | |
| 7,152,880 | B1 | 12/2006 | Pang et al. | |
| 7,210,702 | B2 | 5/2007 | Soderquist et al. | |
| 7,237,802 | B2 | 7/2007 | Rose et al. | |
| 7,261,319 | B2 * | 8/2007 | DePottey et al. | 280/739 |
| 7,328,915 | B2 | 2/2008 | Smith et al. | |
| 7,347,450 | B2 | 3/2008 | Williams et al. | |
| 7,360,789 | B2 | 4/2008 | Bito et al. | |
| 7,364,192 | B2 | 4/2008 | Braun et al. | |
| 7,377,548 | B2 * | 5/2008 | Bauer et al. | 280/743.2 |
| 7,396,045 | B2 * | 7/2008 | Aranzulla et al. | 280/743.2 |
| 7,445,237 | B2 * | 11/2008 | Boyle et al. | 280/739 |
| 7,568,729 | B2 * | 8/2009 | Schnieder et al. | 280/739 |
| 7,597,355 | B2 * | 10/2009 | Williams et al. | 280/739 |
| 7,597,356 | B2 * | 10/2009 | Williams | 280/739 |
| 7,614,653 | B2 * | 11/2009 | Rose et al. | 280/739 |
| 7,625,008 | B2 | 12/2009 | Pang et al. | |
| 7,651,130 | B2 * | 1/2010 | Bauberger | 280/743.2 |
| 7,722,079 | B2 * | 5/2010 | Lee et al. | 280/739 |
| 7,722,080 | B2 * | 5/2010 | Rose et al. | 280/743.2 |
| 7,726,685 | B2 * | 6/2010 | Abe et al. | 280/736 |
| 7,748,738 | B2 * | 7/2010 | Schneider | 280/740 |
| 7,784,828 | B2 * | 8/2010 | Matsu et al. | 280/739 |
| 7,789,421 | B2 * | 9/2010 | Issler et al. | 280/743.2 |
| 7,837,228 | B2 * | 11/2010 | Abe | 280/743.1 |
| 7,845,681 | B2 * | 12/2010 | Abe et al. | 280/743.1 |
| 7,857,346 | B2 * | 12/2010 | Reiter et al. | 280/743.2 |
| 7,878,538 | B2 * | 2/2011 | Abe et al. | 280/739 |
| 7,883,110 | B2 * | 2/2011 | Pausch | 280/739 |
| 7,922,197 | B2 * | 4/2011 | Fukawatase et al. | 280/739 |
| 7,922,200 | B2 * | 4/2011 | Webber | 280/743.2 |
| 7,931,297 | B2 * | 4/2011 | Abe et al. | 280/739 |
| 7,938,445 | B2 | 5/2011 | Smith et al. | |
| 7,942,443 | B2 * | 5/2011 | Dennis et al. | 280/743.2 |
| 7,946,613 | B2 | 5/2011 | Rose et al. | |
| 7,954,850 | B2 * | 6/2011 | Fischer et al. | 280/743.1 |
| 7,959,184 | B2 * | 6/2011 | Fukawatase et al. | 280/739 |
| 7,980,593 | B2 | 7/2011 | Kim | |
| 8,007,004 | B2 | 8/2011 | Kryzaniwskyj et al. | |
| 8,020,889 | B2 * | 9/2011 | Bauer et al. | 280/739 |
| 8,020,891 | B2 * | 9/2011 | Fukawatase et al. | 280/739 |
| 8,070,183 | B2 * | 12/2011 | Kumagai et al. | 280/743.2 |
| 8,226,118 | B2 * | 7/2012 | Rose et al. | 280/743.2 |
| 8,262,130 | B2 * | 9/2012 | Fischer et al. | 280/743.2 |
| 8,322,748 | B2 * | 12/2012 | Abe et al. | 280/739 |
| 2002/0175511 | A1 | 11/2002 | Dunkle et al. | |
| 2003/0020266 | A1 | 1/2003 | Vendely et al. | |
| 2003/0020268 | A1 | 1/2003 | Reiter et al. | |
| 2003/0057691 | A1 | 3/2003 | Tokita et al. | |
| 2003/0127839 | A1 | 7/2003 | Jenkins | |
| 2003/0209895 | A1 | 11/2003 | Gu et al. | |
| 2003/0214125 | A1 | 11/2003 | Schneider et al. | |
| 2004/0012179 | A1 | 1/2004 | Pinsenschaum et al. | |
| 2004/0056459 | A1 | 3/2004 | Kassman et al. | |
| 2004/0090054 | A1 | 5/2004 | Bossecker et al. | |
| 2004/0130135 | A1 | 7/2004 | Ekdahl et al. | |
| 2004/0188990 | A1 | 9/2004 | Short et al. | |
| 2004/0256842 | A1 | 12/2004 | Breed | |
| 2005/0001412 | A1 * | 1/2005 | Schneider et al. | 280/730.1 |
| 2005/0052008 | A1 * | 3/2005 | Rose et al. | 280/740 |
| 2005/0098990 | A1 | 5/2005 | Pinsenschaum et al. | |
| 2005/0225065 | A1 * | 10/2005 | Fujll | 280/743.2 |
| 2005/0236822 | A1 | 10/2005 | Rose et al. | |
| 2005/0248137 | A1 | 11/2005 | Delventhal et al. | |
| 2006/0071461 | A1 | 4/2006 | Williams et al. | |
| 2006/0071462 | A1 | 4/2006 | Smith et al. | |
| 2006/0151979 | A1 | 7/2006 | DePottey et al. | |
| 2006/0197327 | A1 | 9/2006 | Maripudi et al. | |
| 2006/0202454 | A1 | 9/2006 | Parizal et al. | |
| 2007/0045997 | A1 * | 3/2007 | Abe et al. | 280/729 |
| 2007/0052222 | A1 | 3/2007 | Higuchi et al. | |
| 2007/0108750 | A1 * | 5/2007 | Bauer et al. | 280/740 |
| 2007/0108753 | A1 | 5/2007 | Pang et al. | |
| 2007/0126219 | A1 | 6/2007 | Williams | |
| 2007/0132222 | A1 | 6/2007 | Thomas et al. | |
| 2007/0145729 | A1 * | 6/2007 | Ishiguro et al. | 280/739 |
| 2007/0205590 | A1 | 9/2007 | Klinkenberger et al. | |
| 2007/0205591 | A1 * | 9/2007 | Bito | 280/743.2 |
| 2008/0007038 | A1 | 1/2008 | Fischer et al. | |
| 2008/0018086 | A1 | 1/2008 | Ford et al. | |
| 2008/0023095 | A1 | 1/2008 | Kalczynski et al. | |
| 2008/0023959 | A1 | 1/2008 | Crawford et al. | |
| 2008/0042416 | A1 | 2/2008 | Razazi et al. | |
| 2008/0073890 | A1 * | 3/2008 | Williams et al. | 280/739 |
| 2008/0073891 | A1 | 3/2008 | Rose et al. | |
| 2008/0315567 | A1 * | 12/2008 | Fischer et al. | 280/732 |
| 2010/0102542 | A1 * | 4/2010 | Nakajima et al. | 280/743.2 |
| 2010/0201107 | A1 * | 8/2010 | Abe et al. | 280/730.1 |
| 2011/0198828 | A1 * | 8/2011 | Fischer et al. | 280/743.2 |
| 2011/0260431 | A1 * | 10/2011 | Kwon | 280/730.1 |

* cited by examiner

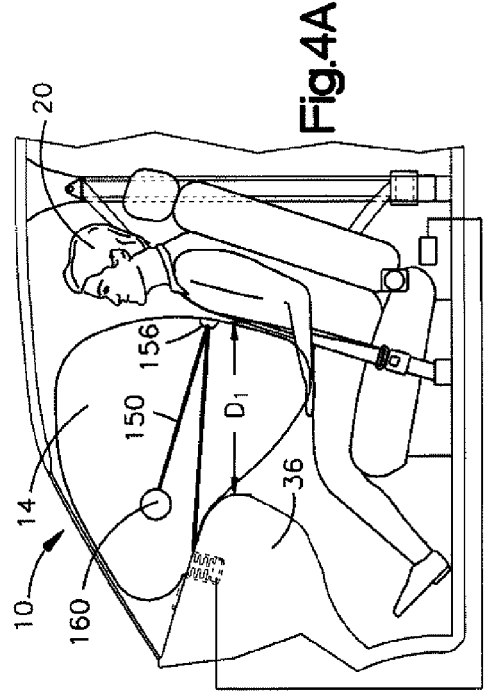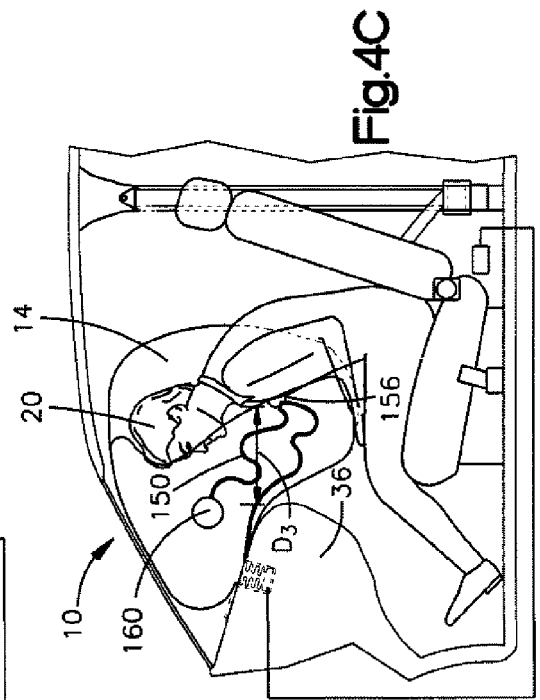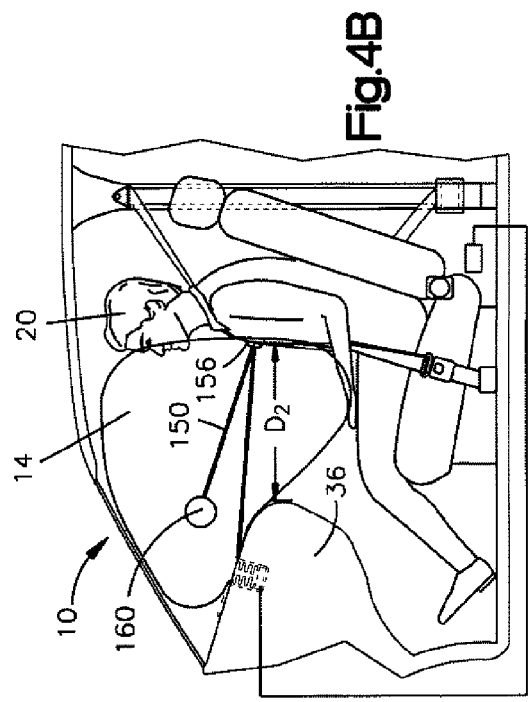

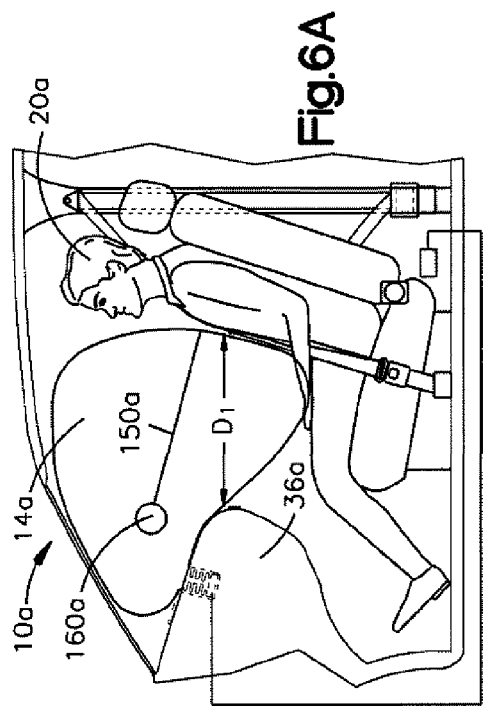
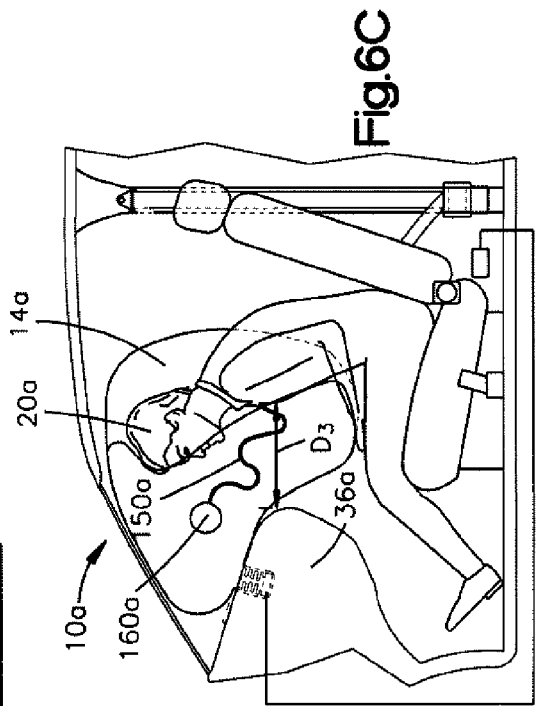
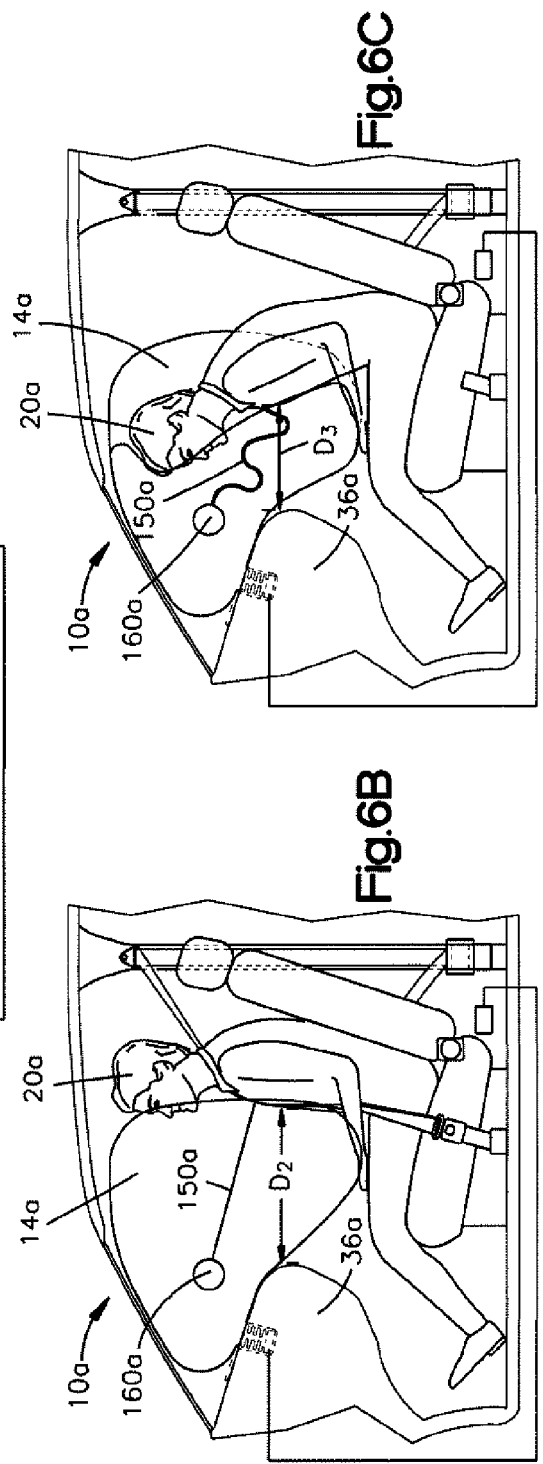

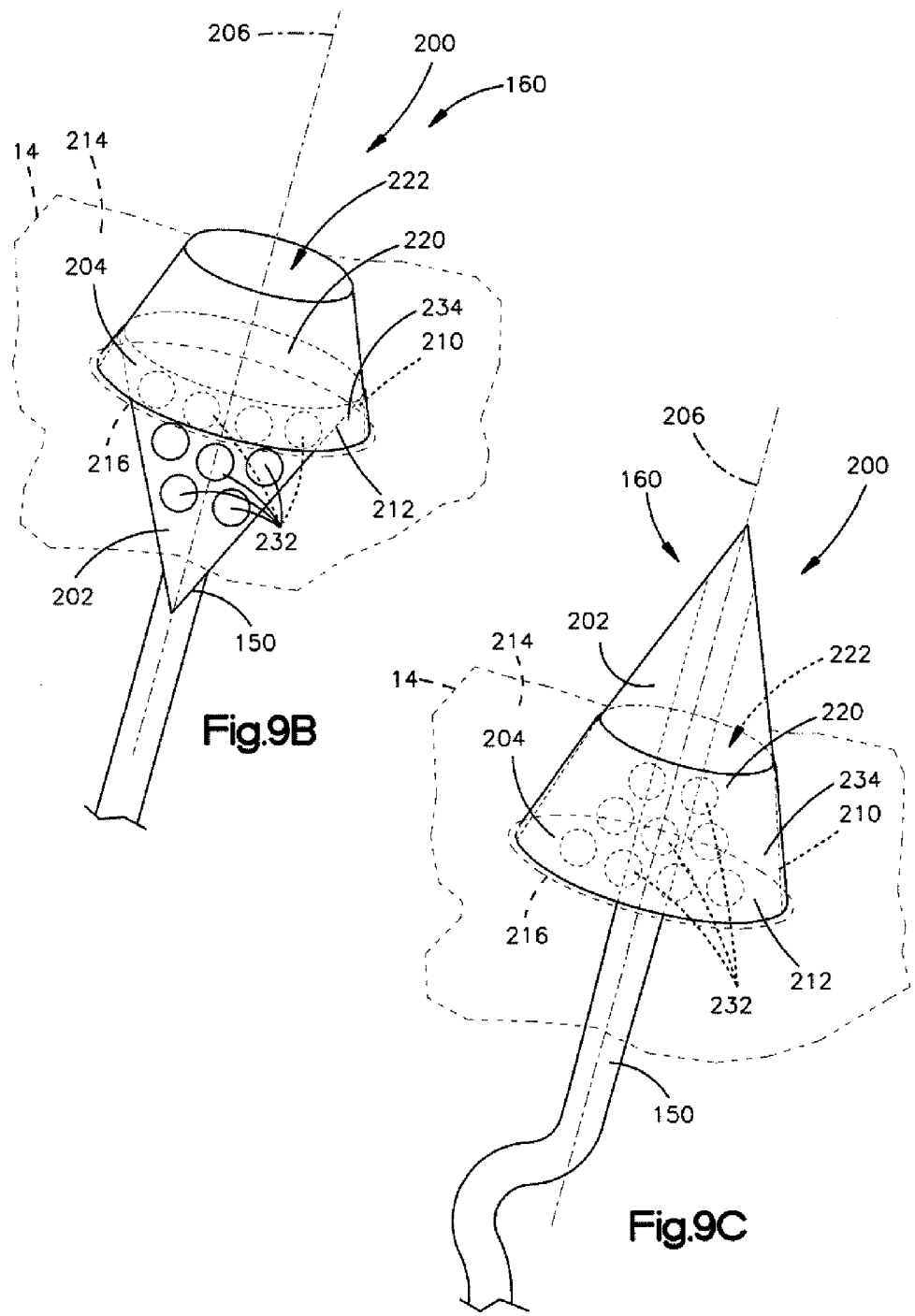

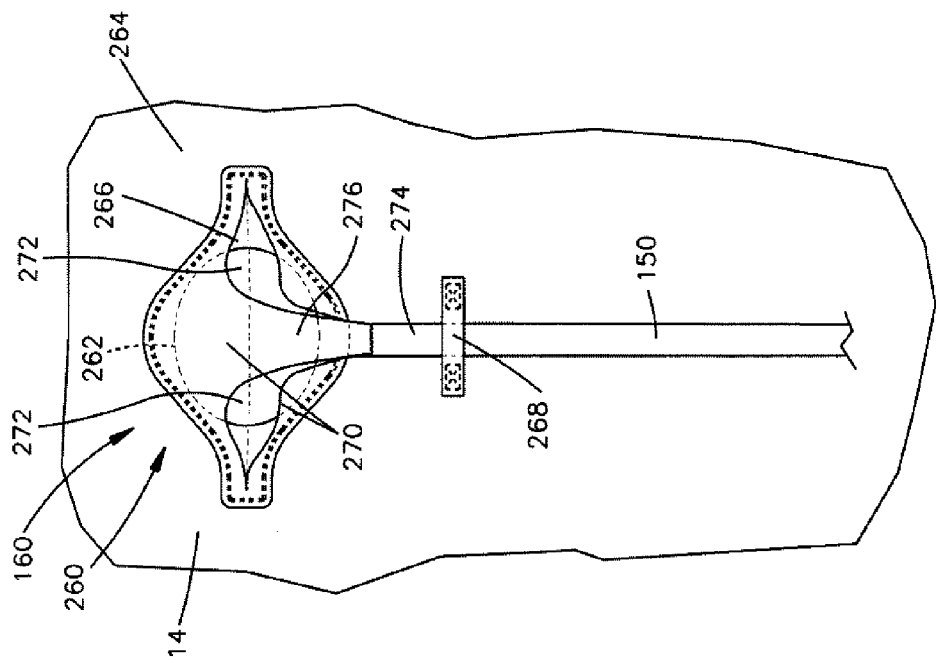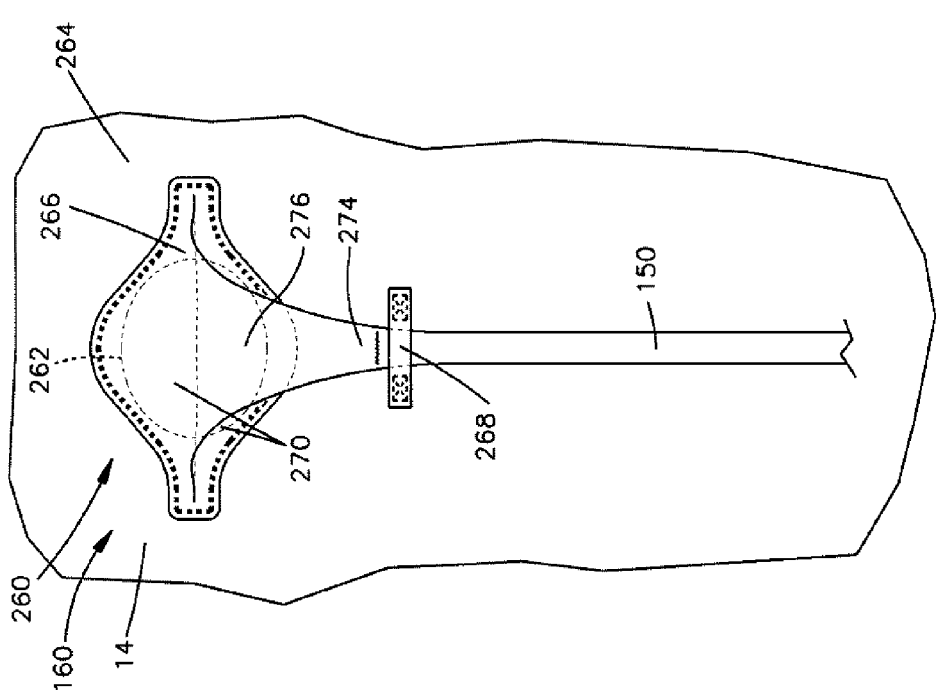

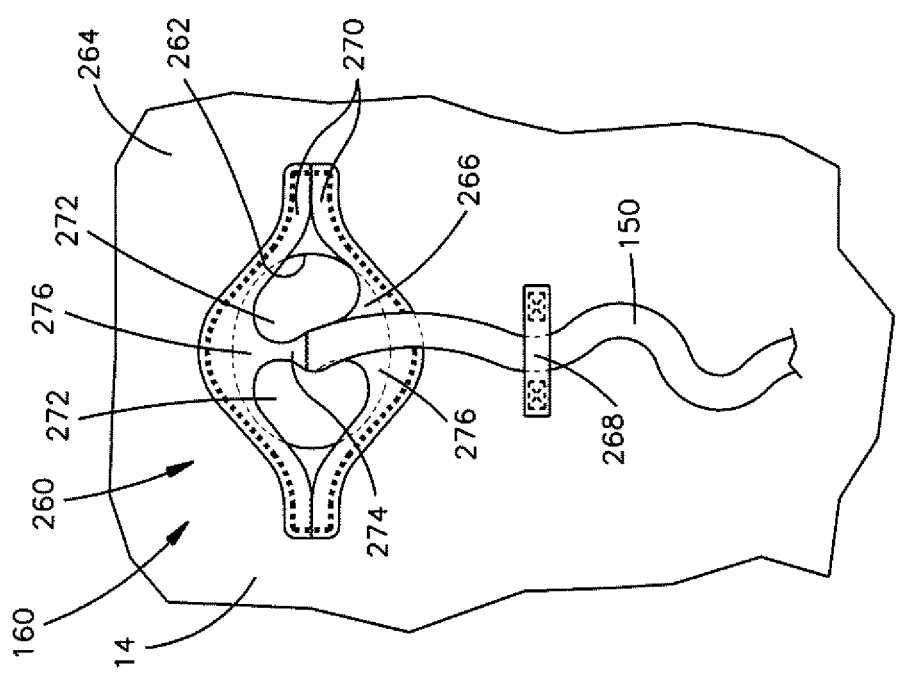

AIR BAG WITH VARIABLE VENTING

RELATED APPLICATIONS

This application is a continuation in part of U.S. patent application Ser. No. 13/482,004, filed May 29, 2012, which is a continuation in part of U.S. patent application Ser. No. 13/114,349, filed May 24, 2011, which is a continuation in part of U.S. patent application Ser. No. 12/912,800, filed Oct. 27, 2010. Each of these related applications are hereby incorporated by reference in their entireties.

FIELD OF THE INVENTION

The invention relates to an apparatus for helping to protect an occupant of a vehicle. More particularly, the invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated condition. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated condition. The air bag cover opens as a result of forces exerted on the cover by the inflating driver air bag.

Another type of air bag is a side impact air bag inflatable between a side structure of a vehicle and a vehicle occupant. Side impact air bags may, for example, be seat mounted, side structure mounted, or door mounted. Another type of air bag is an inflatable knee bolster inflatable between an instrument panel and/or steering column of a vehicle and a vehicle occupant. Inflatable knee bolsters may, for example, be mounted in the instrument panel or on the steering column.

Air bags may include vents for releasing inflation fluid from an inflatable volume of the bag. Airbag vents may be used to control pressurization of the air bag in response to vehicle and/or occupant conditions at the time of deployment. The air bag vents can thus help to produce a desired ride-down effect.

SUMMARY OF THE INVENTION

The invention relates to an apparatus for helping to protect an occupant of a vehicle. The apparatus comprises an inflatable vehicle occupant protection device inflatable between a vehicle surface and the vehicle occupant. A vent releases inflation fluid from the protection device. The vent has an actuated condition and a non-actuated condition. A tether has a first connection with the vent and a second connection with the protection device. Tension on the tether actuates the vent. The vent is initially in the non-actuated condition upon initial deployment of the protection device. Further deployment of the protection device causes the tether to place the vent in the actuated condition. Occupant penetration into the protection device causes the tether to place the vent in the non-actuated condition.

The present invention also relates to an apparatus for helping to protect an occupant of a vehicle. The apparatus comprises an inflatable vehicle occupant protection device inflatable between a vehicle surface and the vehicle occupant. A vent for releasing inflation fluid from the protection device has an actuated condition and a non-actuated condition. A tether has a first connection with the vent and a second connection with the protection device. Fluid pressure acting on the vent urges the vent toward a non-actuated condition. Tension on the tether urges the vent toward an actuated condition. Fluid pressure acting on the protection device in the region of the second connection tensions the tether, which overcomes the fluid pressure acting on the vent and places the vent in the actuated condition.

The present invention further relates to an apparatus for helping to protect an occupant of a vehicle. The apparatus includes an inflatable vehicle occupant protection device inflatable between a vehicle surface and the vehicle occupant. A vent for releasing inflation fluid from the protection device has an actuated condition and a non-actuated condition. The vent is configured to be in the non-actuated condition when the protection device deploys. A tether has a first connection with the vent and a second connection with the protection device. The tether is configured to prevent actuation of the vent in response to the protection device being inhibited from deployment and actuate the vent in response to substantial deployment of the protection device. The tether is also configured to throttle actuation of the vent through a range of deployment between initial deployment and substantial deployment of the protection device. The tether is further configured to place the vent in the non-actuated condition in response to occupant penetration into the protection device beyond a predetermined a predetermined degree.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIGS. 4A-4C are schematic views illustrating different conditions of the apparatus of FIGS. 1 and 2;

FIGS. 6A-6C are schematic views illustrating different conditions of an apparatus having a different configuration;

FIGS. 9A-9C are enlarged views of a portion of the apparatus in different conditions, according to an embodiment of the invention;

FIGS. 10A-10C are enlarged views of a portion of the apparatus in different conditions, according to an embodiment of the invention;

DETAILED DESCRIPTION OF THE INVENTION

Figure 1:
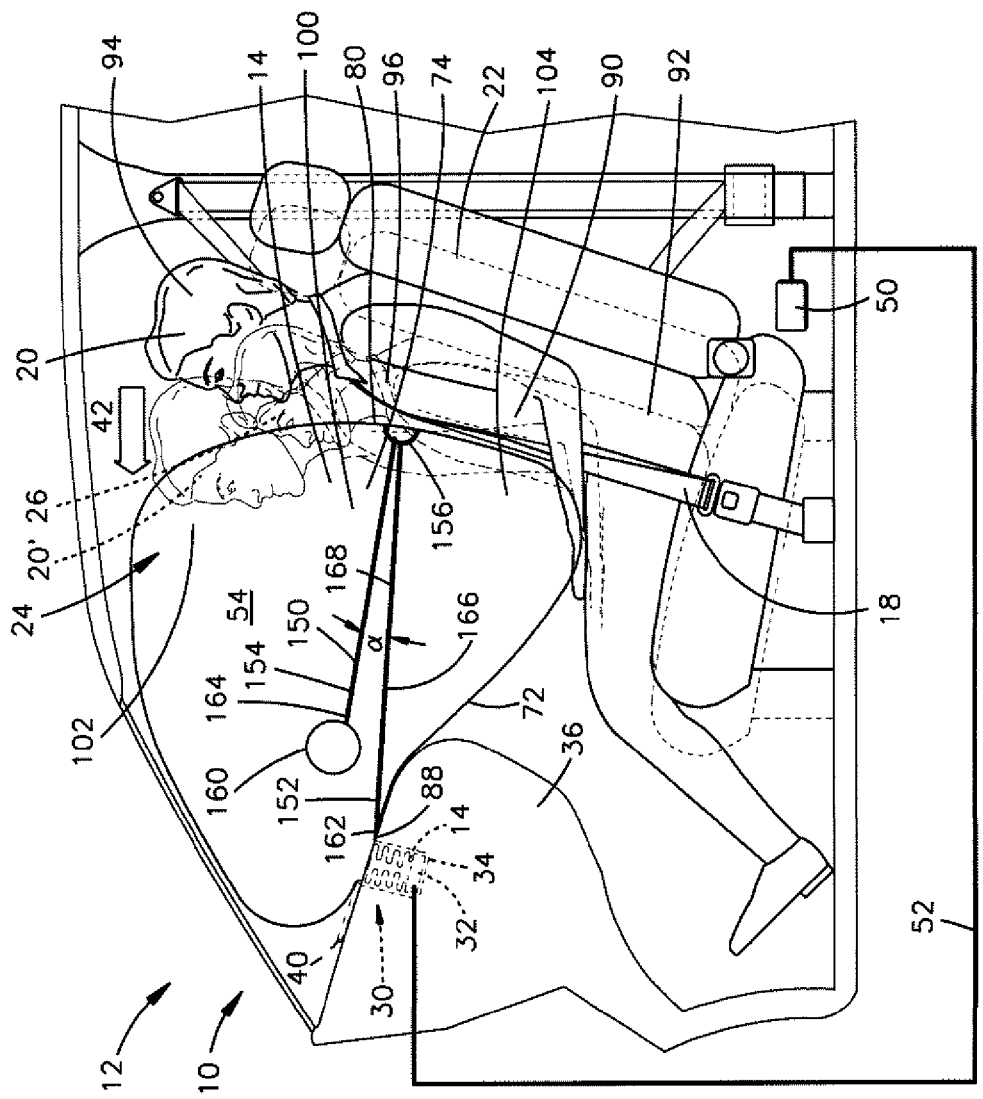
FIGS. 1 and 2 are schematic side views illustrating an apparatus for helping to protect an occupant of a vehicle, according to an aspect of the invention.
Figure 2:
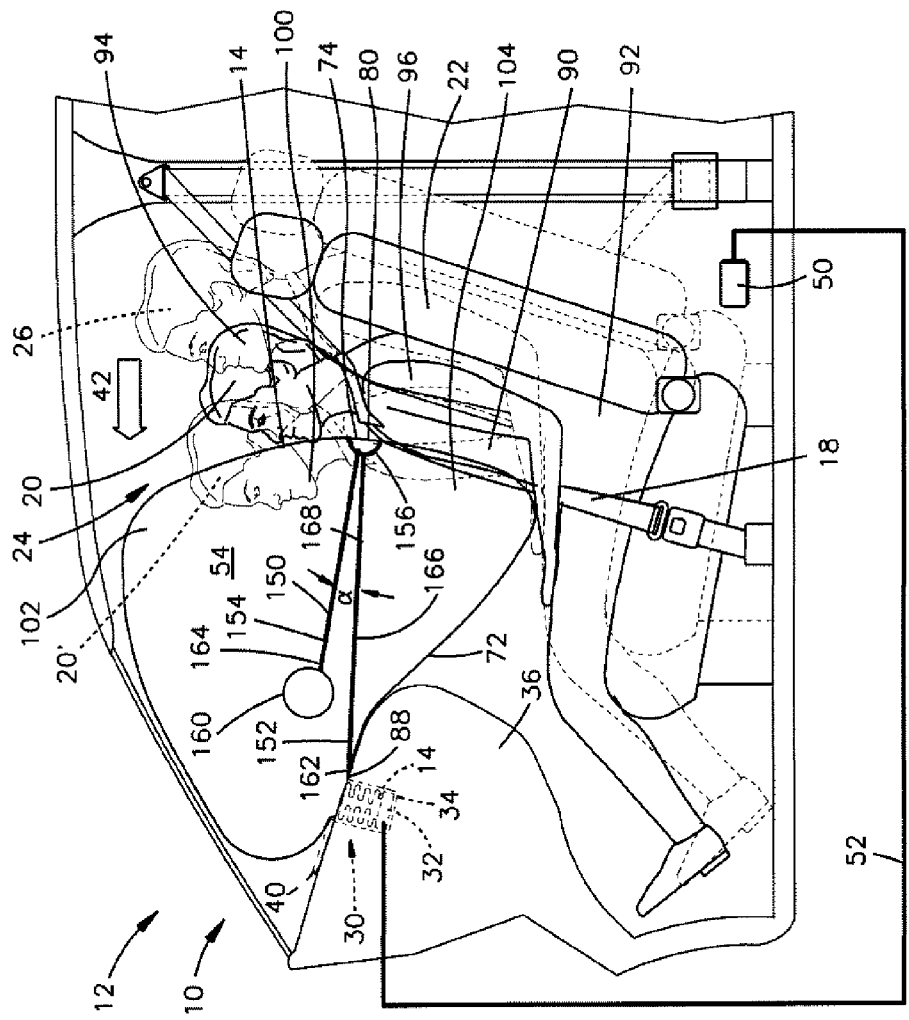

An apparatus 10 for helping to protect an occupant 20 of a vehicle 12 includes an inflatable vehicle occupant protection device 14 in the form of an air bag. In the embodiment illustrated in FIGS. 1 and 2, the air bag 14 is a passenger frontal air bag for helping to protect an occupant 20 of a seat 22 on a passenger side 24 of the vehicle 12. As shown in FIGS. 1 and 2, the vehicle 12 also includes a seatbelt 18 for helping to protect the vehicle occupant 20.

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated, deployed, and pressurized condition illustrated in solid lines in FIG. 1. The air bag 14, while inflated, helps protect the vehicle occupant 20 from impacts with parts of the vehicle 12, such as the instrument panel 36 and/or steering wheel (not shown).

The air bag 14, when deployed in response to an event for which occupant protection is desired, helps protect the occupant 20 by helping to absorb the force of impact placed on the air bag by the occupant. When the occupant 20 impacts the air bag 14, the occupant penetrates into the air bag, which absorbs and distributes the impact forces throughout the large area and volume of the bag. By "penetrates" into the air bag 14, it is meant to refer to the instance where, in the case of a frontal impact to the vehicle 12, the occupant is moved forward, as indicated by the arrow labeled 42 in FIGS. 1 and 2, into engagement with the air bag 14.

The "penetration" of the occupant into the air bag 14 is the distance or degree to which the occupant 20 moves into the inflated depth of the air bag. In other words, the degree of penetration could be measured as the distance the penetrating occupant 20 moves a given point on a front panel 74 of the air bag 14 toward the instrument panel 36. For example, penetration could be measured as the distance between a point on the front panel 74 and a fixed point on the instrument panel 36 or between a point on the occupant 20 (e.g., the occupant's chest) and a fixed point on the instrument panel.

Several factors determine the degree to which an occupant 14 penetrates the air bag 14. For example, the size or mass of the occupant 20, the speed at which the occupant strikes the air bag 14, the pressurization of the air bag, the seat position (forward/rearward, upright/reclined), and whether or not the occupant is restrained by the seatbelt 18 all help determine the degree to which the occupant penetrates the air bag in a given deployment scenario. Some of these determining factors are illustrated in FIG. 3, which depicts chest to instrument panel air bag penetration for occupants that are different in size, that are belted versus unbelted, and that strike the air bag 14 at different speeds.

Figure 3:
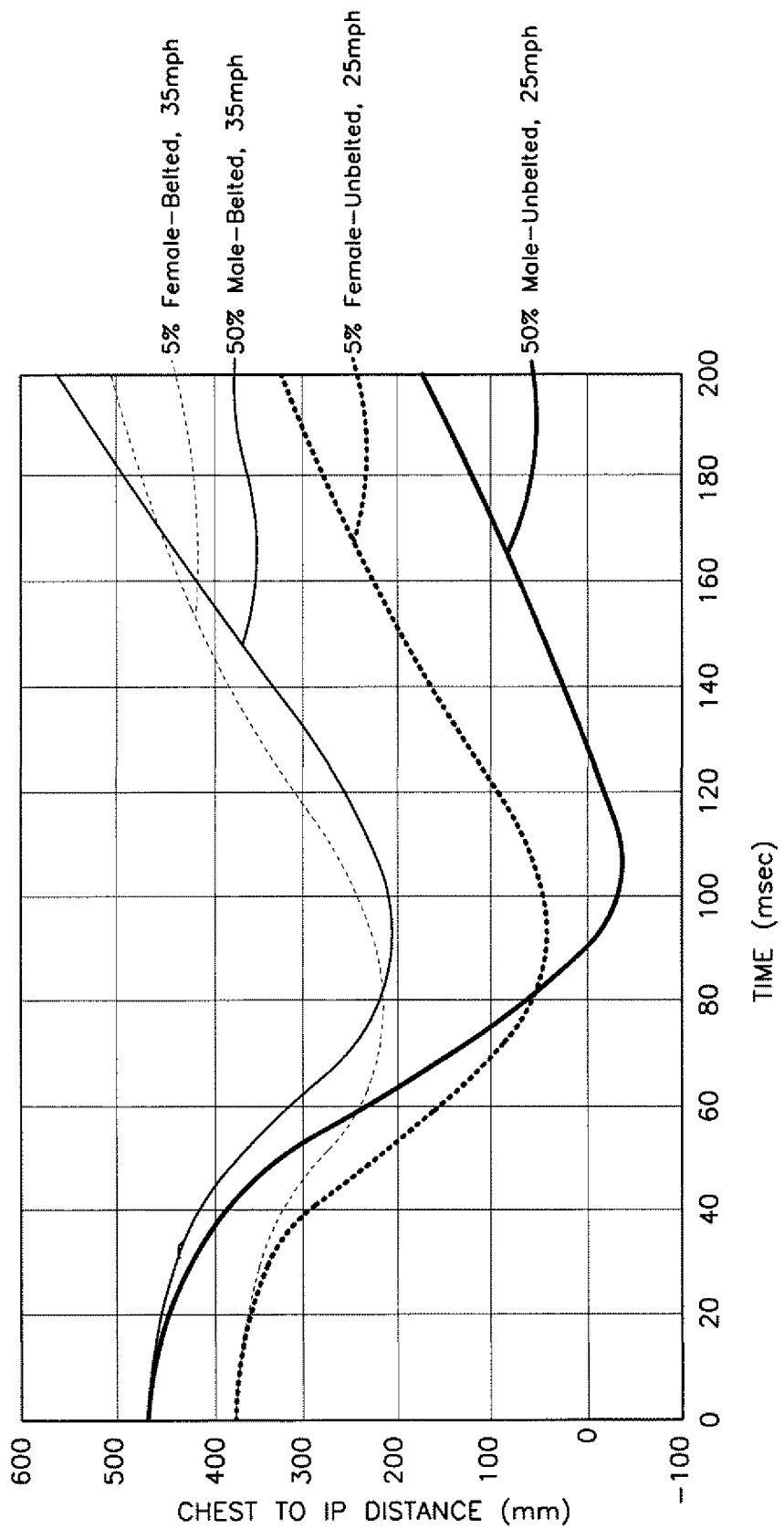
FIG. 3 is a chart illustrating certain occupant characteristics under different vehicle operating conditions.

FIG. 3 illustrates penetration values for two differently sized occupants—a $50^{th}$ percentile male occupant (50% male) and a $5^{th}$ percentile female occupant (5% female). The 50% male is derived from statistical values for the U.S. male population. The 50% male has the mean height and weight of the male U.S. population, meaning that roughly half of the U.S. male population is taller/heavier and roughly half of the U.S. male population is shorter/lighter. The 50% male is thus an average or medium sized male occupant, and thus would typically adjust his vehicle seat to a middle position, especially when driving the vehicle. The 5% female is derived from statistical values for the U.S. female population. The 5% female has a mean height and weight that, is taller/heavier than only roughly 5% of the U.S. female population. Conversely, this means that roughly 95% U.S. female population is taller/heavier than the 5% female. The 5% female is thus a small female occupant, and thus would typically adjust her vehicle seat to a forward position, especially when driving the vehicle.

FIG. 3 illustrates that whether the occupant is belted versus unbelted has an effect on occupant penetration into the air bag. In the tests used to produce the data shown in FIG. 3, the seat position of the 5% female is more than 50 mm forward of the seat position of the 50% male. As shown in FIG. 3, an unbelted 5% female occupant travelling at 25 mph penetrates the air bag over approximately 150 mm more than a belted 5% female occupant traveling at 35 mph. Similarly, an unbelted 50% male occupant travelling at 25 mph penetrates the air bag well over 200 mm more (approximately 225 mm) than a belted 50% male occupant traveling at 35 mph. In fact, the unbelted 5% female traveling at 25 mph penetrates the air bag approximately 150 mm more than the belted 50% male occupant traveling at 35 mph.

Those skilled in the art will appreciate that much can be extrapolated from belted/unbelted data illustrated in FIG. 3. For example, a 50% 25 mph unbelted male will strike through the air bag and impact the instrument panel. A 5% 25 mph unbelted female will come within 50 mm of striking through the air bag and impacting the instrument panel. Due to the differing seat positions for the occupants, belted 50% male and 5% females travelling at 35 mph will come within about 200 mm of striking through the air bag and impacting the instrument panel. It will thus be appreciated that the difference between striking through and cushioning can be a matter of relatively short distances/positions. For example, if the seat position of the 50% male is 100 mm closer, the difference between strikethrough and non-strikethrough is 100 mm, which can easily be taken up if the occupant is somewhat taller or heavier, if the seatbelt is somewhat loose, or if the vehicle is travelling at a somewhat higher rate of speed. It thus becomes very difficult to respond actively to the vast number of combinations of occupant size/weight, seat position, vehicle speed, and buckle conditions that may be present at the time of air bag deployment.

To account for this, the air bag 14 may have one or more actuatable features for helping to control or tailor inflation, deployment, and pressurization of the air bag in response to vehicle conditions, occupant conditions, or both vehicle and occupant conditions. These features are actuatable passively in response to vehicle and occupant conditions at the time of inflation. Thus, in the illustrated embodiments, these features are actuatable without relying on active sensors and/or actuators, such as electrical or pyrotechnic actuators.

Referring to FIGS. 1 and 2, the air bag 14 includes a tether 150 for actuating a vent 160 for releasing inflation fluid from the inflatable volume 54 of the air bag 14. The tether 150 is adapted to actuate the vent 160 depending on vehicle or occupant conditions in the vehicle 12 both at the time of deployment and during air bag 14 deployment. In the embodiment of FIGS. 1 and 2, the adaptive tether 150 comprises a single length of tether material that has a first connection 162 connecting a first end portion 152 of the tether. The first connection 162 may, for example, connect the first end portion 152 of the tether 150 to a rear panel 72 of the air bag 14 or to a portion of the air bag module 30, such as the housing 34. The tether 150 has a second connection 164 connecting a second end portion 154 of the tether. The second connection 164 may, for example, connect the second end portion 154 of the tether 150 to the vent 160.

The tether 150 extends through a guide 156 that is connected to the air bag 14. In the embodiment of FIGS. 1 and 2, the guide 156 is mounted on a front panel 74 of the air bag 14. The guide 156 anchors the tether 150 to the air bag and permits the tether 150 to slide or otherwise move through its structure. The guide 156 divides the tether 150 into a first segment 166 and a second segment 168.

Figure 8:
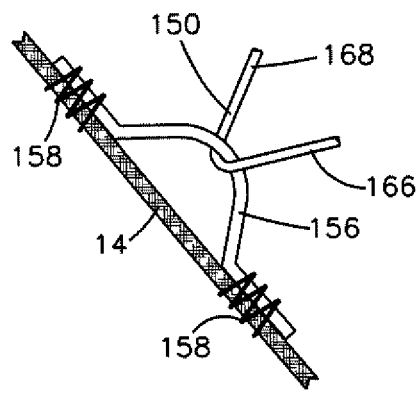
FIG. 8 is an enlarged view of a portion of the apparatus.

The guide 156 may take various forms. Referring to FIG. 8, the guide 156 may, for example, comprise a piece or loop of material, such as air bag fabric, that is secured to a panel of the air bag 14 by means such as stitching 158. Alternative means for connecting the guide 156 to the air bag 14 include ultrasonic welding, adhesives, and heat bonding, and mechanical fasteners. The guide 156 may have alternative constructions and/or configurations. For example, instead of a piece or loop of material, the guide 156 may have a metal or plastic construction. Guides having this construction may, for instance, be in the form of a metal/plastic D-ring or a metal/plastic eyelet or grommet reinforcing a hole or aperture in a fabric material. As another example, the guide 156 may be configured as a part of the air bag housing 34, in which case the guide may comprise a ring or aperture formed in or connected to the housing structure.

The adaptive tether 150 functions in cooperation with the guide 156 to be responsive to vehicle conditions, occupant conditions, or both vehicle conditions and occupant conditions to control actuation of the vent 160. Particularly, the tether 150 throttles the vent 160 to help adapt the inflation, deployment, configuration, shape, pressurization, or a combination thereof, of the air bag 14. In the embodiment of FIGS. 1 and 2, this control is implemented passively through the physical construction and configuration of the air bag 14 and the adaptive tether 150, the guide 156, and the vent 160.

In particular, in the embodiment of FIGS. 1 and 2, the air bag 14, adaptive tether 150, guide 156, and vent 160 are constructed, configured, and arranged to throttle the vent and thereby adapt the inflation, deployment, and pressurization of the air bag 14 depending on the penetration of the occupant into the air bag 14. This is beneficial because vehicle/occupant conditions, such as the occupant size/weight, whether the occupant is belted or unbelted, the occupant's seat position (forward/rearward, upright/reclined), and the vehicle speed all affect the degree of occupant penetration into the air bag. By adapting the air bag 14 passively in response to occupant penetration, there is no need for an active determination of all of these factors because all of these factors are accounted for inherently and automatically through the configuration and construction of the air bag.

In describing the function of the vent 160, the terms "actuated," "non-actuated," and "throttled" are used to identify different conditions of the vent. The actuated condition of the vent 160 refers to the condition of the vent when the tether 150 is fully tensioned due, for example, to full or substantially full deployment of the air bag 14. The non-actuated condition of the vent 160 refers to the condition of the vent when the tether has not been tensioned due to air bag deployment to an extent sufficient to cause any significant change in inflation fluid flow through the vent. The throttled condition of the vent 160 refers to the condition of the vent where air bag displacement has been blocked, e.g., due to an out-of-position occupant, or altered, e.g., due to an occupant penetrating into the air bag, such that inflation fluid flow through the vent is altered.

FIG. 1 illustrates (in solid lines) an occupant 20, such as a 50% male, in a normally seated and belted condition with the vehicle seat 22 in an upright mid-positioned (i.e., between full rear and full forward) condition. As shown in FIG. 1, in the illustrated case of a belted 50% male occupant 20, the seatbelt 18 serves to help restrain the occupant 20. As a result, the belted occupant 20 is restrained from moving toward the instrument panel 36. This allows the air bag 14 to inflate and deploy with comparatively little resistance or inhibition from the occupant 20 to a fully inflated and deployed condition. The tether 150 is thus tensioned and places the vent 160 in its actuated condition. In FIG. 1, as shown generally at 20', the belted occupant may bend forward and penetrate somewhat into a middle portion 100 or upper portion 102 of the air bag 14.

The guide 156 does not move significantly in response to upper body penetration of the mid-positioned belted 50% male occupant 20. As shown in FIG. 1, however, the degree or distance to which the occupant 20' penetrates into the air bag 14 may be comparatively or relatively small. If circumstances, such as the severity of the event, the tightness of the seatbelt 18, or the position of the occupant 20 at the time the event occurs, result in further penetration of the occupant, the guide 156 may move toward the instrument panel 36 and the vent 160 may be throttled. Otherwise, the vent 160 may remain in its (fully) actuated condition and the air bag 14 is left to provide its intended cushioning and ride down effect.

In the illustration of FIG. 1, the occupant 20 does not penetrate significantly into the portion of the air bag 14 where the guide 156 is located. Therefore, in the case of the 50% male occupant illustrated in FIG. 1, the portion of the air bag 14 including the guide 156 deploys fully, the tether 150 becomes tensioned, and the tensioned tether 150 actuates the vent 160. This can be compared to the small occupant, such as a 5% female, which is shown in dashed lines at 20''.

FIG. 2 illustrates (in solid lines) an occupant 20, such as a 5% female, in a normally seated and belted condition with the vehicle seat 22 in an upright forward positioned condition. The conditions in FIG. 2 are identical to those of FIG. 1, except the occupant is smaller and the seat is in the forward position. In FIG. 2, the seatbelt 18 serves to help restrain the occupant 20 from moving toward the instrument panel 36. As shown in dashed lines at 20', similar to FIG. 1, the belted 5% female occupant may bend forward and penetrate into the air bag 14.

FIG. 2 illustrates that the forward position of the vehicle seat 22 can make a significant difference in the deployment of the air bag 14. The forward position of the vehicle seat 22 positions the occupant 20 closer to the instrument panel 36 such that the occupant blocks the air bag 14 from reaching the fully inflated and deployed position. Therefore, other conditions being equal, the 5% female occupant of FIG. 2 can experience penetration to a comparatively greater extent than the 50% male occupant (shown in dashed lines at 26). As a result, in the case of the 5% female occupant illustrated in FIG. 2, the air bag 14 and guide 156 can be are blocked from reaching full deployment. As a result, the tether 150 may not fully actuate the vent 160. The vent 160 is thus throttled passively in accordance with the vehicle and occupant conditions that position the occupant 20 as shown in FIG. 2.

Those skilled in the art will appreciate that the difference in the fore/aft seat position between the 50% male in FIG. 1 and the 5% female in FIG. 2 may not be large. The difference may, for example, be as little as 50 mm. Since, however, it is the small, forward positioned 5% female (FIG. 2) that penetrates further into the air bag 14, it is desirable to ensure that the vent 160 is throttled effectively and reliably. It is equally desirable that the vent 160 throttles differently in the case of the large mid/rear positioned 50% male occupant (FIG. 1) that does not penetrate significantly into the air bag 14. This can be difficult, given the small difference in the positions of the two occupants.

To account for this, the combination of the guide 156 and tether 150 allow not only for throttling the vent 160, but also for adjusting the sensitivity of the throttling. The vent 160 has an open condition (e.g., full-open), a closed condition (e.g., full-closed), and conditions between these two extremes in which the vent is partially opened/closed. "Throttling" as used herein is meant to refer to the fact that the degree to which the tether 150, being configured for displacement and/or tension adjustments in response to occupant penetration, correspondingly controls, i.e., throttles, the degree to which the vent is opened/closed. As the vent 160 moves between the full open and full closed condition and vice versa, the degree to which the vent is actuated (i.e., % opened or % closed) changes.

"Throttling sensitivity" as used herein is meant to the degree or rate at which the vent 160 is throttled in response to a given change in displacement/tension of the tether 150. As described above, displacement of the tether 150 corresponds on the degree of occupant penetration into the air bag 14 at the location where the guide 156 is connected. Thus, a tether 150 and vent 160 configuration with comparatively high throttling sensitivity would produce a comparatively large change in vent throttling in response to a given change in tether displacement/tension. Similarly, a tether 150 and vent 160 configuration with comparatively low throttling sensitivity would produce a comparatively small change in vent throttling in response to the same given change in tether displacement/tension. In this description, the throttling sensitivity is quantified as a ratio of tether displacement to air bag penetration distance ($D_T:D_P$).

In the embodiment shown in FIGS. 1 and 2, the tether 150 and guide 156 are configured such that the first and second segments 166 and 168 extend at a small acute angle (tether angle α) relative to each other. If the segments 166 and 168 were configured to extend parallel to each other, it would be easy to recognize that occupant penetration into the air bag 14 that results in movement of the guide 156 of X millimeters toward the instrument panel 36 would produce a corresponding change in tether 150 displacement of 2X millimeters. Thus, according to the invention, the tether 150 and guide 156 are configured to produce a comparatively high throttling sensitivity, approaching 2:1 ($D_T:D_P$). This high throttling sensitivity allows for throttling the vent 160 in a manner that is highly sensitive and responsive to differing air bag penetrations. Thus, referring to the embodiment illustrated in FIGS. 1 and 2, this allows the tether 150 and guide 156 to differentiate and respond to the 50% male and 5% female differently even though the difference in positioning may be slight.

The throttling sensitivity of the tether 150 and vent 160 configuration can be adjusted by changing or adjusting the angle α at which the tether extends from the guide 156. In the single guide configuration of FIGS. 1 and 2, the sensitivity is maximized by configuring the tether segments 166 and 168 as close to parallel as possible, thus producing a throttling sensitivity that approaches 2:1 ($D_T:D_P$). To decrease the throttling sensitivity, the tether 150 and vent 160 combination are adjusted/configured so that the angle α is increased. As the angle α increases, the throttling sensitivity decreases, and the degree to which the tether 150 throttles the vent 160 for a given occupant penetration decreases.

In the embodiments of FIGS. 1 and 2, it should be noted that the tether 150 remains tensioned even though, in FIG. 2, the occupant 20 penetrates the air bag 14 and moves the guide 156. This is because the vent 160 itself takes up the slack in the tether 150 as the occupant 20 penetrates the air bag 14 and the vent is throttled between the fully open and fully closed position. This is illustrated in FIGS. 4A-4C.

Referring to FIG. 4A, When the air bag 14 is fully inflated and deployed, the tether 150 becomes fully tensioned and fully actuates the vent 160. The vent 160 is configured such that an actuatable vent part (not shown in FIGS. 4A-4C) that controls fluid flow through the vent is urged to move in response to inflation fluid pressure in the air bag 14. Inflation fluid pressure in the air bag 14 urges the vent 160 toward the non-actuated condition. The tether 150 is configured such that tension on the tether urges the actuatable vent part toward the actuated condition against inflation fluid pressure in the air bag 14. Thus, when the air bag 14 is fully inflated and deployed, the tether 150 overcomes the urging that inflation fluid pressure places on the vent member and places the vent 160 in the fully actuated condition. When the vent 160 is throttled due to occupant penetration, the tether 150 is tensioned between the front panel 74 (FIGS. 1 and 2) of the air bag 14, the anchor point 162, and the vent 160.

Referring to FIG. 4B, as the occupant 20 penetrates the air bag 14 and begins displacing the guide 156, the tether 150 is displaced and the actuatable vent member is permitted to move in response to fluid pressure in the air bag 14, thus throttling the vent 160. As the vent 160 throttles between the actuated and non-actuated conditions, the tension on the tether 150 is maintained. As the degree of occupant penetration increases, the throttling of the vent 160 adjusts accordingly.

Referring to FIG. 4C, once the occupant 20 penetrates the air bag 14 to a degree such that the vent 160 is throttled to the non-actuated condition, tension on the tether 150 is released. At this point, since the vent 160 is in the non-actuated condition, further penetration does not affect the vent. If, for some reason, the occupant 20 moves in a direction that reverses the penetration, and inflation fluid pressure in the air bag 14 is still sufficient, the tether 150 could again become tensioned and vent 160 throttling could resume.

The vent 160 may be configured such that the actuated condition of the vent is either an open condition or a closed condition. In this description, an "actuated open" vent is closed at the time of deployment, and unrestricted air bag deployment tensions the tether and actuates the vent (substantially or fully) opened. Occupant penetration into the protection device throttles the vent back towards the closed condition. Additionally, in this description, an "actuated closed" vent is open at the time of deployment, and unrestricted air bag deployment tensions the tether and actuates the vent (substantially or fully) closed. Occupant penetration into the protection device throttles the vent back towards the open condition. Those skilled in the art will appreciate that the selection of a actuated open or actuated closed vent configuration can be based on a variety of factors, such as the position of the air bag (driver frontal/passenger frontal) and the desired cushioning and ride down characteristics.

Figure 9A:
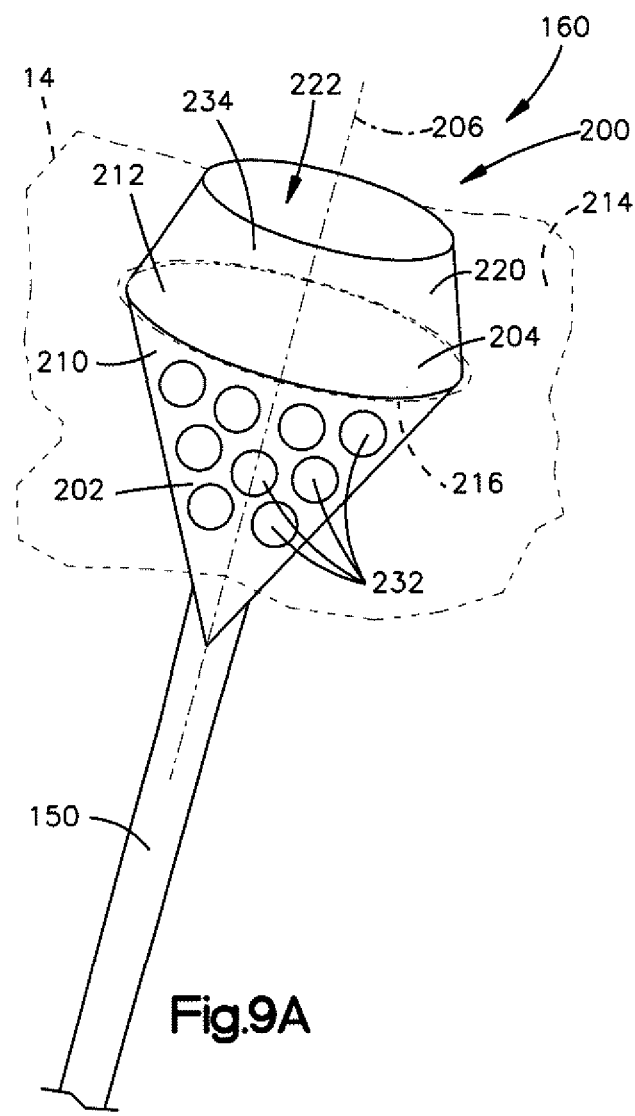

The vent 160 may have any actuated open or actuated closed configuration that is capable of performing with the tether 150 to provide throttled venting in accordance with the description set forth above. For purposes of illustration, an example of an actuated open vent is illustrated in FIGS. 9A-9C and an example of an actuated closed vent is illustrated in FIGS. 10A-10C. The actuated, non-actuated, and throttled conditions of the vents of FIGS. 9A-9C and 10A-10C correspond to the vehicle and occupant conditions illustrated in FIGS. 4A-4C according to table 1:

TABLE 1

| Vent Condition | Actuated Open Vent FIGS. 9A-9C | Actuated Closed Vent FIGS. 10A-10C | Corresponding Figure |
| --- | --- | --- | --- |
| Actuated | Open | Closed | FIG. 4A |
| Throttled | In Between | In Between | FIG. 4B |
| Non-Actuated | Closed | Open | FIG. 4C |

Referring to FIGS. 9A-9C, the vent 160 is an actuated open vent 200 that is actuatable to release inflation fluid from the air bag 14. In this embodiment, inflation fluid pressure in the air bag 14 acts to place/maintain the vent 200 in the open condition at the time of deployment. The structure of the actuated open vent 200 is illustrated schematically in FIGS. 9A-9C. The vent 200 has a generally conical configuration forming a conduit that extends through an opening 216 in a wall 214 of the air bag 14. The opening 216 has a shape that mates with the cross-sectional shape of the of the vent 200 at its interface with the wall 214. Thus, in the embodiment of FIGS. 9A-9C, the opening 216 in the air bag wall 214 is circular.

Referring to FIGS. 9A-9C, the vent 200 comprises a first portion comprising a conical inner wall 202 and a second portion comprising a frusto-conical outer wall 204. The inner and outer walls 202 and 204 share a common central axis 206. As shown in FIGS. 9A-9C, respective base portions 210 and 212 of the inner and outer walls 202 and 204 meet each other at the air bag wall 214, where they are connected to the air bag 14 about the periphery of the opening 216 in the wall 214. As shown in FIGS. 9A-9C, the inner and outer walls 202 and 204 may have congruent or substantially congruent configurations in which their respective base portions 210 and 212 have equal or substantially equal diameters, and the respective walls extend at equal or substantially equal angles with respect to the common axis 206.

The inner wall 202 tapers down from the base portion 210 and extends away from the air bag wall 214 into the inflatable volume of the air bag 14. The outer wall 204 tapers down from the base portion 212 and extends away from the air bag wall 214 and away from the air bag 14 outside the inflatable volume of the air bag 14. The frusto-conical outer wall 204 has an open end portion 220 that defines an outlet 222 of the vent 200. The outer wall 204 defines a passage or discharge chamber 234 through which inflation fluid may travel en route to the outlet 222. The inner wall 202 has a closed end portion 224 to which a first end portion of a tether 150 is connected. The inner wall 202 thus acts as an actuatable vent member. The inner wall 202 includes a plurality of vent openings 232 spaced about the circumference of the inner wall. In the embodiment illustrated in FIGS. 9A-9C, the openings 232 have a generally circular shape. The openings 232 could, however, have alternative configurations. For example, the openings could comprise elongated slots, X-shaped slits, cross-shaped slits, T-shaped slits, Y-shaped slits, or other suitably shaped openings.

The actuated open vent 200 has an actuated open condition illustrated in FIG. 9A, a throttled intermediate condition illustrated in FIG. 9B, and a non-actuated closed condition illustrated in FIG. 9C. In the actuated open condition of FIG. 9A, the tether 150 actuates the vent 200, tensioning or otherwise pulling/maintaining the inner wall 202 in an open condition positioned at least partially within the inflatable volume 54 of the air bag 14. The tensioned tether 150 acts against inflation fluid pressure in the air bag 14, which urges the inner wall outward toward the closed condition of FIG. 9C. The tether 150 is fully tensioned and is not displaced by a penetrating occupant. The condition of the vent 200 illustrated in FIG. 9A thus corresponds to the fully inflated and deployed condition illustrated in FIG. 4A and described in reference to FIGS. 4A-4C. In this condition, the tether 150 substantially or completely prevents the inner wall 202 from entering the discharge chamber 234. In the open condition, fluid communication is established between the inflatable volume 54 and the atmosphere surrounding the air bag 14 via the vent openings 232, the discharge chamber 234, and the outlet 222.

In the throttled condition of FIG. 9B, tension on the tether 150 is maintained but, due to a penetrating occupant, the air bag 14 has not reached the fully inflated and deployed condition. The condition of the vent 200 illustrated in FIG. 9B thus corresponds to the partial occupant penetration condition illustrated in FIG. 4B and described in reference to FIGS.

4A-4C. Due to the configuration of the vent 200, the pressure of inflation fluid in the air bag 14 urges the inner wall 202 into the discharge chamber 234. In the condition of FIG. 4B, the inner wall 202 is placed in a throttled condition in which the inner wall is partially inverted into the discharge chamber 234, blocking a portion of the vent openings 232 (shown in dashed lines) and leaving open the remaining vent openings (shown in solid lines). The vent 200 thus throttles inflation fluid flow through the partially blocked/partially unblocked openings 232. The pressure of inflation fluid in the air bag 14 presses the inner wall 202 against the blocked openings 232 and thereby forms an effective seal for blocking flow through those openings.

In the closed condition of FIG. 9C, the tether 150 does not tension or otherwise pull/maintain the inner wall 202 in the open condition positioned within the inflatable volume 54 of the air bag 14. The non-actuated condition of the vent 200 illustrated in FIG. 9C thus corresponds to the high occupant penetration condition illustrated in FIG. 4C and described in reference to FIGS. 4A-4C. The inner wall 202 is thus free to move in response to inflation fluid pressure in the inflatable volume 54 of the air bag 14. Under the pressure of inflation fluid in the inflatable volume 54, the inner wall 202 moves to a closed condition positioned at least partially within the discharge chamber 234 defined by the outer wall 204. In the closed condition, the inner wall 202 is inverted from the open condition. Since the inner wall 202 and outer wall 204 have congruent or substantially congruent configurations, the inner wall 202 when in the closed condition mates with, overlies, and follows the contour of the outer wall 204, thereby forming a tight and close fit between the walls. Inflation fluid pressure in the air bag 14 maintains this fit and the resulting seal that blocks inflation fluid flow through the openings 232.

In the closed condition of the vent 200, the vent openings 232 are positioned against corresponding portions of the outer wall 204. Since the conical inner wall 202 is closed at the end portion 224, the inflation fluid pressure in the air bag presses the portions of the inner wall 202 surrounding the vent openings 232 against the corresponding portions of the outer wall 204. As a result, the outer wall 204 constrains the inner wall 202 and blocks or substantially blocks fluid communication between the inflatable volume and the atmosphere surrounding the air bag 14. Inflation fluid venting is thus blocked in the non-actuated, closed condition of the vent 200.

Referring to FIGS. 10A-10C, the vent 160 is an actuated closed vent 260 that is actuatable to retain inflation fluid in the air bag 14. In this embodiment, inflation fluid pressure in the air bag 14 acts to place/maintain the vent 260 in the closed condition at the time of deployment. The structure of the actuated closed vent 260 is illustrated schematically in FIGS. 10A-10C. The vent 260 includes one or more vent openings 262 formed in a panel 264, such as a side panel, of the air bag 14. A vent door 266 is secured to the side panel 264 and covers the openings 262. The tether 150 has a first end portion secured to the vent door 266, and extends through a guide 268 that is secured to the air bag panel 264. The vent door 266 thus acts as an actuatable vent member.

The vent door 266 is secured to the panel 264 by known means, such as stitching, ultrasonic welding, heat bonding, or adhesives. In the illustrated embodiment, the vent door 266 itself includes separate panels 270 of material that are secured to each other by known means, such as stitching, to give the vent door the illustrated configuration. Those skilled in the art will appreciate that the vent door 266 could have alternative single panel or multiple panel constructions.

The vent door 266 has one or more vent openings 272 formed therein. In the embodiment illustrated in FIGS. 10A-10C, the vent door 266 includes two vent openings 272. The tether 150 is secured to a strip 274 of material of the vent door 266 that is positioned between the vent openings 272. The strip 274 interconnects opposing cover flaps 276 of the vent door 266.

The actuated closed vent 260 has an actuated closed condition illustrated in FIG. 10A, a throttled intermediate condition illustrated in FIG. 10B, and a non-actuated open condition illustrated in FIG. 10C. In the closed condition of FIG. 10A, the vent 260 has a closed condition in which the tether 150 is tensioned and not displaced by a penetrating occupant. The condition of the vent 260 illustrated in FIG. 10A thus corresponds to the fully inflated and deployed condition illustrated in FIG. 4A and described in reference to FIGS. 4A-4C. In the closed condition of FIG. 10A, the tensioned tether 150 is forced by the guide 268 to extend along the air bag panel 264. In this condition, the cover flap portions 276 of the vent door 266 are tensioned along the air bag panel 264. The shape and size of the cover flap portions 276 are configured such that, when tensioned along the air bag panel 264, they close the vent openings 272 of the vent door 266 and cover the opening 262 in the air bag panel 264. In the closed condition of the vent 260, the vent door 266 thus blocks inflation fluid from exiting the air bag 14.

In the throttled condition of FIG. 10B, the tether 150 is tensioned, but somewhat displaced by a penetrating occupant. The condition of the vent 260 illustrated in FIG. 10B thus corresponds to the partial occupant penetration condition illustrated in FIG. 4B and described in reference to FIGS. 4A-4C. In the throttled condition of FIG. 10B, the tensioned tether 150 is forced by the guide 268 to extend along the air bag panel 264. In this condition, the displacement of the tether 150 caused by the partial penetration of the occupant permits the cover flap portions 276 of the vent door 266 to bulge outward partially and assume a somewhat convex configuration. This allows the cover flap portions 276 of the vent door 266 to partially open the vent openings 272 under the pressure of inflation fluid in the air bag 14. Thus, in the throttled condition of FIG. 10B, the vent 260 vents inflation fluid at a reduced, i.e., throttled, flow rate.

In the open condition of FIG. 10C, due to displacement by a penetrating occupant, the tether 150 is not tensioned. The condition of the vent 260 illustrated in FIG. 10C thus corresponds to the high occupant penetration condition illustrated in FIG. 4C and described in reference to FIGS. 4A-4C. In the opened condition of FIG. 10C, the tether 150 is relaxed or slacked, thereby permitting the cover flap portions 276 of the vent door 266 to bulge outward fully and assume a convex configuration. In this condition, the vent openings 272 are opened due to the pressure of inflation fluid in the air bag 14 and thereby release inflation fluid from the air bag 14 through the openings 262 and 272.

According to the invention, the air bag 14, vent 160, and tether 150 configurations disclosed herein advantageously are configured and tailored for multi-phase adaptive venting. The construction of the vent 160 (see, e.g., the vent 200 of FIGS. 9A-9C or the vent 260 of FIGS. 10A-10C), in combination with the various tether 150 configurations shown and described herein, permit adaptation not only with respect to how the vent is throttled in response to occupant penetration, but also how the vent responds prior to occupant penetration, the timing of the throttling response once occupant penetration begins, and the vent response dependent upon the vehicle/occupant conditions prior to penetration.

FIGS. 4A-4C illustrate the apparatus 10 in three conditions. FIG. 4A illustrates the apparatus 10 in a condition prior to the occupant 20 engaging the air bag 14. In this condition, the vent 160 is fully actuated due to the air bag 14 reaching its fully deployed condition. Also, in this condition, the occupant 20 is spaced from the air bag 14 and must move forward in order to engage and penetrate into the air bag 14. This distance can be measured in terms of occupant chest to instrument panel (IP) distance, which is indicated at $D_1$ in FIG. 4A. The distance that the occupant 20 must travel before this engagement takes place can vary depending on the occupant/seat position prior to air bag deployment.

FIG. 4B illustrates the apparatus 10 in a condition when the occupant 20 initially engages the air bag 14, having moved forward from the position illustrated in FIG. 4A. The chest to IP distance when this occurs is indicated at $D_2$ in FIG. 4B. At this point, further occupant penetration into the air bag 14 moves the guide 156 which, through the resulting movement of the tether 150, throttles the vent 160 toward the non-actuated condition. As described previously herein, occupant penetration into the air bag 14 and rebound out of the air bag produces corresponding throttling of the vent 160 toward the in the non-actuated and actuated conditions, respectively, of the vent 160.

FIG. 4C illustrates the apparatus 10 in a condition when the occupant 20 has fully penetrated into the air bag 14, having moved forward from the position illustrated in FIG. 4B. The chest to IP distance when this occurs is indicated at $D_3$ in FIG. 4C. At this point, the guide 156 has been moved by the penetrating occupant 20 to the point where the tether 150 is slackened. In this condition, the vent 160 has been fully throttled by the penetrating occupant 20, thus placing the vent 160 in the non-actuated condition.

Figure 5:
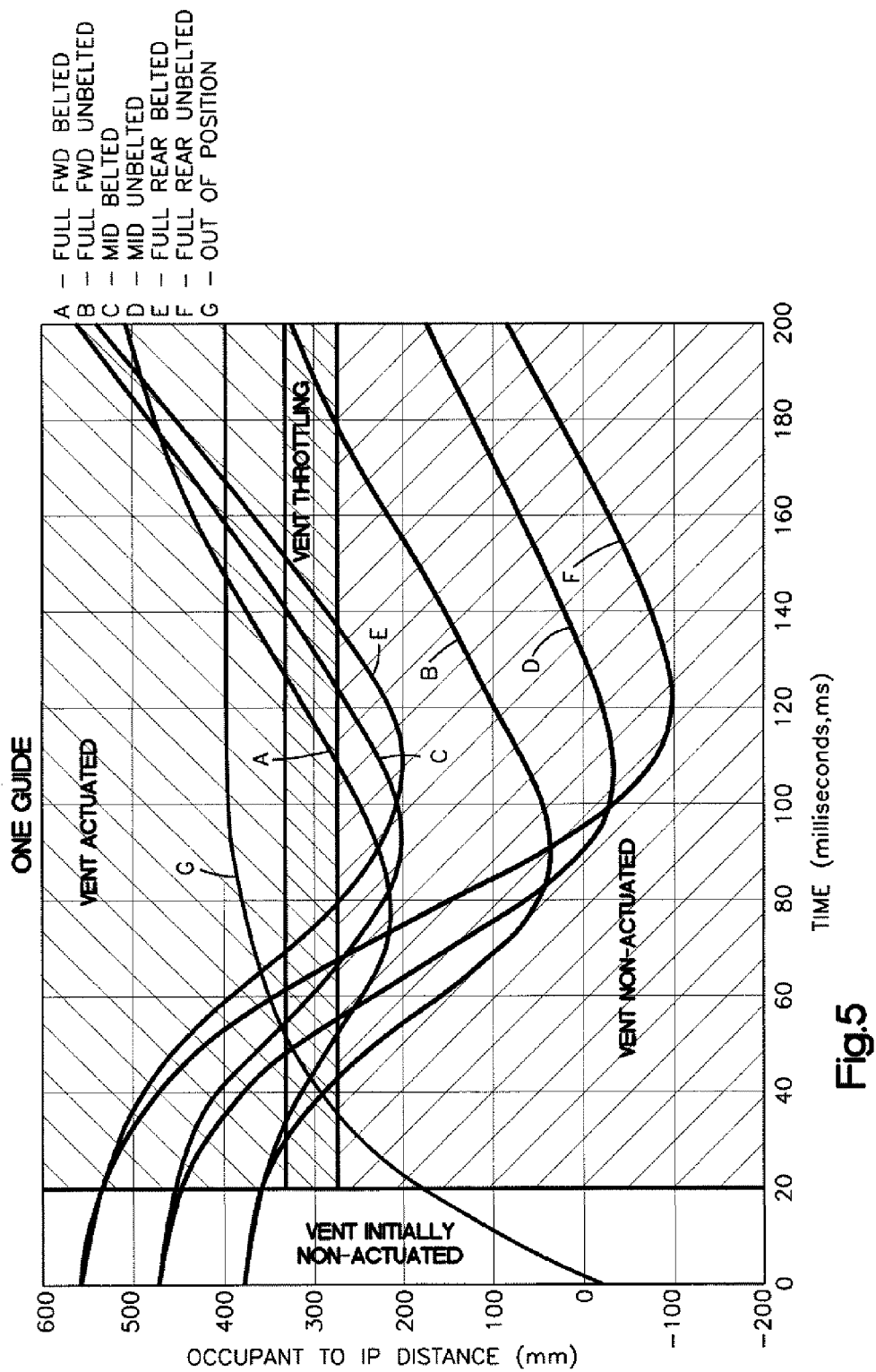
FIG. 5 is a chart illustrating certain occupant characteristics under different vehicle operating conditions and corresponding vent conditions associated with the vent configuration of FIGS. 4A-4C.

According to the invention, the apparatus 10 has several configurable features that help provide the multi-phase adaptive venting functionality. FIG. 5 illustrates the multi-phase adaptive venting functionality of the apparatus 10 of FIGS. 4A-4C, which features a single guide 156 and the resulting two segment tether 150. The chart of FIG. 5 illustrates occupant penetration in terms of occupant chest to instrument panel (IP) distance versus time, where time=0 at the start of the impact event that triggers deployment of the air bag 14. The various regions of the chart, which are bounded by bold lines, indicate the various vent conditions which, once the air bag 14 is deployed, depend on the occupant chest to I/P distance. At time=0, the vent 160 is in the non-actuated condition. Uninhibited, the vent 160 is configured to transition to the actuated condition by time=20 ms. FIG. 5 illustrates how the apparatus 10 of the present invention is configured between the three phases/conditions of vent actuation—non-actuated, actuated, and throttling—in response to the vehicle and occupant conditions that are gauged in terms of occupant penetration, i.e., chest to instrument panel (IP) distance.

The chart of FIG. 5 and the regions depicted thereon correspond to the configuration illustrated in FIGS. 4A-4C. Thus, as shown in FIG. 5, once the air bag 14 is deployed, occupant penetration (i.e., chest to IP distance) from 600 mm to approximately 330 mm will not affect the vent 160, and the vent will remain in the actuated condition. Occupant penetration from approximately 330 mm to approximately 270 mm will throttle the vent 160 from the actuated condition toward the non-actuated condition. Once occupant penetration reaches approximately 270 mm, the vent 160 reaches the non-actuated condition and remains in the non-actuated condition as long as the occupant penetration is approximately 270 mm or less.

The various lines labeled A through G in FIG. 5 illustrate the operation of the apparatus 10 in response to varying vehicle and occupant conditions at the time of deployment of the air bag 14 of FIGS. 4A-4C. The line identified at A in FIG. 5 corresponds to a belted occupant 20 with a full forward seat position that produces an initial chest to IP distance (see FIG. 4a) of approximately 380 mm. This would correspond to a belted 5% female occupant. As shown in FIG. 5, the apparatus 10 is configured to respond to the full forward belted occupant with the vent 160 transitioning quickly to the throttling condition (i.e., within about 15 ms, at time≈35 ms, see FIG. 4B). The vent 160 throttles and reaches the non-actuated condition within about 20 ms, at time≈55 ms). The occupant penetrates into the air bag 14, reaching maximum penetration of about 220 mm chest to IP at time≈75 ms (see FIG. 4C). The occupant 20 then rebounds and the vent 160 throttles at time≈110 ms back to the actuated condition at time≈125 ms. If there is sufficient pressure in the air bag 14, the vent 160 may throttle back to the actuated condition. Any further impacts with the air bag 14 would thus occur with the vent 160 in the actuated condition, and any further ride-down would proceed with the vent throttling to the non-actuated condition at the penetration values dictated by the configuration of the apparatus 10 (i.e., throttling at≈330 mm chest to IP, and non-actuated at≈270 mm).

The line identified at B in FIG. 5 corresponds to an unbelted occupant 20 with a full forward seat position that produces an initial chest to IP distance of approximately 380 mm. This would correspond to an unbelted 5% female occupant. As shown in FIG. 5, the apparatus 10 is configured to respond to the full forward unbelted occupant with the vent 160 transitioning quickly to the throttling condition (i.e., within about 10 ms, at time≈30 ms). The vent 160 throttles and reaches the non-actuated condition within about 15 ms, at time≈45 ms). The occupant penetrates into the air bag 14, reaching maximum penetration of about 40 mm chest to IP at time≈90 ms. The occupant 20 then rebounds and the vent 160 throttles at time≈180 ms back toward the actuated condition at time≈200 ms. If there is sufficient pressure in the air bag 14, the vent 160 may throttle back to the actuated condition.

The line identified at C in FIG. 5 corresponds to a belted occupant 20 with a mid seat position between full forward and full rearward that produces an initial chest to IP distance (see FIG. 4a) of approximately 470 mm. This would correspond to a belted 50% male occupant. As shown in FIG. 5, the apparatus 10 is configured to respond to the mid positioned belted occupant with the vent 160 transitioning to the throttling condition (i.e., within about 35 ms, at time≈55 ms, see FIG. 4B). The vent 160 throttles and reaches the non-actuated condition within about 15 ms, at time≈70 ms). The occupant penetrates into the air bag 14, reaching maximum penetration of about 200 mm chest to IP at time≈90 ms (see FIG. 4C). The occupant 20 then rebounds and the vent 160 throttles at time≈125 ms back to the actuated condition at time≈140 ms. If there is sufficient pressure in the air bag 14, the vent 160 may throttle back to the actuated condition. Any further impacts with the air bag 14 would thus occur with the vent 160 in the actuated condition, and any further ride-down would proceed with the vent throttling to the non-actuated condition at the penetration values dictated by the configuration of the apparatus 10 (i.e., throttling at≈330 mm chest to IP, and non-actuated at≈270 mm).

The line identified at D in FIG. 5 corresponds to an unbelted occupant 20 with a mid seat position between full forward and full rearward that produces an initial chest to IP distance of approximately 470 mm. This would correspond to an unbelted 50% male occupant. As shown in FIG. 5, the apparatus 10 is configured to respond to the mid positioned unbelted occupant with the vent 160 transitioning to the throttling condition (i.e., within about 30 ms, at time≈50 ms). The vent 160 throttles and reaches the non-actuated condition within less than about 10 ms, at time≈55 ms). The occupant penetrates into the air bag 14, reaching maximum penetration of about −30 mm chest to IP at time≈110 ms. The −30 mm penetration is indicative of the unbelted occupant 20 impacting the instrument panel 36. The occupant 20 then rebounds and the vent 160 throttles at time>200 ms back toward the actuated condition. If there is sufficient pressure in the air bag 14, the vent 160 may throttle back to the actuated condition.

The line identified at E in FIG. 5 corresponds to a belted occupant 20 with a full rearward seat position that produces an initial chest to IP distance (see FIG. 4a) of approximately 560 mm. This would correspond to a belted 50% male occupant. As shown in FIG. 5, the apparatus 10 is configured to respond to the full rearward belted occupant with the vent 160 transitioning to the throttling condition (i.e., within about 50 ms, at time≈70 ms, see FIG. 4B). The vent 160 throttles and reaches the non-actuated condition within about 10 ms, at time≈80 ms). The occupant penetrates into the air bag 14, reaching maximum penetration of about 200 mm chest to IP at time≈110 ms (see FIG. 4C). The occupant 20 then rebounds and the vent 160 throttles at time≈135 ms back to the actuated condition at time≈150 ms. If there is sufficient pressure in the air bag 14, the vent 160 may throttle back to the actuated condition. Any further impacts with the air bag 14 would thus occur with the vent 160 in the actuated condition, and any further ride-down would proceed with the vent throttling to the non-actuated condition at the penetration values dictated by the configuration of the apparatus 10 (i.e., throttling at≈330 mm chest to IP, and non-actuated at≈270 mm).

The line identified at F in FIG. 5 corresponds to an unbelted occupant 20 with a full rearward seat position that produces an initial chest to IP distance of approximately 560 mm. This would correspond to an occupant leaning forward against the instrument panel 36 at time=0. As shown in FIG. 5, the apparatus 10 is configured to respond to the rear positioned unbelted occupant with the vent 160 transitioning to the throttling condition (i.e., within about 40 ms, at time≈60 ms). The vent 160 throttles and reaches the non-actuated condition within less than about 10 ms, at time≈70 ms). The occupant penetrates into the air bag 14, reaching maximum penetration of about −100 mm chest to IP at time≈120 ms. The −100 mm penetration is indicative of the unbelted occupant 20 impacting the instrument panel 36. The occupant 20 then rebounds and the vent 160 throttles at time>200 ms back toward the actuated condition. If there is sufficient pressure in the air bag 14, the vent 160 may throttle back to the actuated condition.

The line identified at G in FIG. 5 corresponds to an out of position occupant 20, e.g., a 50% male occupant leaning forward against the instrument panel 36 at time=0. As shown in FIG. 5, the apparatus 10 responds to the out of position occupant with the vent 160 remaining in the non-actuated condition from time=0 through time≈35 ms due to the out of position occupant inhibiting air bag deployment. At time≈35 ms, the vent 160 throttles due to air bag deployment and the occupant moving away from the instrument panel 36. At time≈55 ms, the vent 160 reaches the actuated condition and remains in this condition beyond time=200 ms. Any further impacts with the air bag 14 would thus occur with the vent 160 in the actuated condition, and any further ride-down would proceed with the vent throttling to the non-actuated condition at the penetration values dictated by the configuration of the apparatus 10 (i.e., throttling at≈330 mm chest to IP, and non-actuated at≈270 mm).

The configuration of the vent 160 with the tether 150 and guide 156 shown in FIGS. 4A-4C is illustrative of one example implementation of the invention. The configuration of the apparatus could vary. For example, another implementation of the invention is illustrated in FIGS. 6A-6C. The embodiment of FIGS. 6A-6C differs from the embodiment of FIGS. 4A-4C only in that the guide is omitted, leaving the tether connecting the vent directly to the air bag. In describing the embodiment of FIGS. 6A-6C, the reference numbers used in FIGS. 4A-4C will be utilized with the suffix "a" being added to avoid confusion.

Referring to FIG. 6A, When the air bag 14a is fully inflated and deployed, the tether 150a becomes fully tensioned and fully actuates the vent 160a. The vent 160a is configured such that an actuatable vent part (not shown in FIGS. 6A-6C) that controls fluid flow through the vent is urged to move in response to inflation fluid pressure in the air bag 14a. Inflation fluid pressure in the air bag 14a urges the vent 160a toward the non-actuated condition. The tether 150a is configured to such that tension on the tether urges the actuatable vent part vent toward the actuated condition against inflation fluid pressure in the air bag 14a. Thus, when the air bag 14a is fully inflated and deployed, the tether 150a overcomes the urging that inflation fluid pressure places on the vent member and places the vent 160a in the fully actuated condition. When the vent 160a is throttled due to occupant penetration, the tether 150a is tensioned directly between the front panel of the air bag 14a and the vent 160a.

Referring to FIG. 6B, the occupant 20a penetrates the air bag 14a and begins displacing the tether 150a, which permits the actuatable vent member to move in response to fluid pressure in the air bag 14a, thus throttling the vent 160a. As the vent 160a throttles between the actuated and non-actuated conditions, the tension on the tether 150a is maintained. As the degree of occupant penetration increases, the throttling of the vent 160a adjusts accordingly.

Referring to FIG. 6C, once the occupant 20a penetrates the air bag 14a to a degree such that the vent 160a is throttled to the non-actuated condition, tension on the tether 150a is released. At this point, since the vent 160a is in the non-actuated condition, further penetration does not affect the vent. If, for some reason, the occupant 20a moves in a direction that reverses the penetration, and inflation fluid pressure in the air bag 14a is still sufficient, the tether 150a could again become tensioned and vent 160a throttling could resume.

The vent 160a may be an actuated open vent or an actuated closed vent. Examples of actuated open and actuated closed vent types are shown and described herein with reference to FIGS. 9A-9C and 10A-10C, respectively. The selection of a actuated open or actuated closed vent configuration can be based on a variety of factors, such as the position of the air bag (driver frontal/passenger frontal) and the desired cushioning and ride down characteristics. The actuated, non-actuated, and throttled conditions of the vents of FIGS. 9A-9C and 10A-100 correspond to the vehicle and occupant conditions illustrated in FIGS. 6A-6C according to table 2:

TABLE 2

| Vent Condition | Actuated Open Vent FIGS. 9A-9C | Actuated Closed Vent FIGS. 10A-10C | Corresponding Figure |
| --- | --- | --- | --- |
| Actuated | Open | Closed | FIG. 6A |
| Throttled | In Between | In Between | FIG. 6B |
| Non-Actuated | Closed | Open | FIG. 6C |

According to the present invention, the air bag 14a, vent 160a, and tether 150a configurations disclosed herein advantageously are configured and tailored for multi-phase adaptive venting. The construction of the vent 160a (see, e.g., the vent 200 of FIGS. 9A-9C or the vent 260 of FIGS. 10A-10C), in combination with the various tether 150a configurations shown and described herein, permit adaptation not only with respect to how the vent is throttled in response to occupant penetration, but also how the vent responds prior to occupant penetration, the timing of the throttling response once occupant penetration begins, and the vent response dependent upon the vehicle/occupant conditions prior to penetration.

FIGS. 6A-6C illustrate the apparatus 10a in three conditions. FIG. 6A illustrates the apparatus 10a in a condition prior to the occupant 20a engaging the air bag 14a. In this condition, the vent 160a is fully actuated due to the air bag 14a reaching its fully deployed condition. Also, in this condition, the occupant 20a is spaced from the air bag 14a and must move forward in order to engage and penetrate into the air bag 14a. This distance can be measured in terms of occupant chest to instrument panel (IP) distance, which is indicated at $D_1$ in FIG. 6A. The distance that the occupant 20a must travel before this engagement takes place can vary depending on the occupant/seat position prior to air bag deployment.

FIG. 6B illustrates the apparatus 10a in a condition when the occupant 20a initially engages the air bag 14a, having moved forward from the position illustrated in FIG. 6A. The chest to IP distance when this occurs is indicated at $D_2$ in FIG. 6B. At this point, further occupant penetration into the air bag 14a moves the tether 150a and throttles the vent 160a toward the non-actuated condition. Occupant penetration into the air bag 14a and rebound out of the air bag produces corresponding throttling of the vent 160a toward the in the non-actuated and actuated conditions, respectively, of the vent 160a.

FIG. 6C illustrates the apparatus 10a in a condition when the occupant 20a has fully penetrated into the air bag 14a, having moved forward from the position illustrated in FIG. 6B. The chest to IP distance when this occurs is indicated at $D_3$ in FIG. 6C. At this point, the occupant 20a has penetrated the air bag 14a to the point where the tether 150a is slackened. In this condition, the vent 160a has been fully throttled by the penetrating occupant 20a, thus placing the vent 160a in the non-actuated condition.

Figure 7:
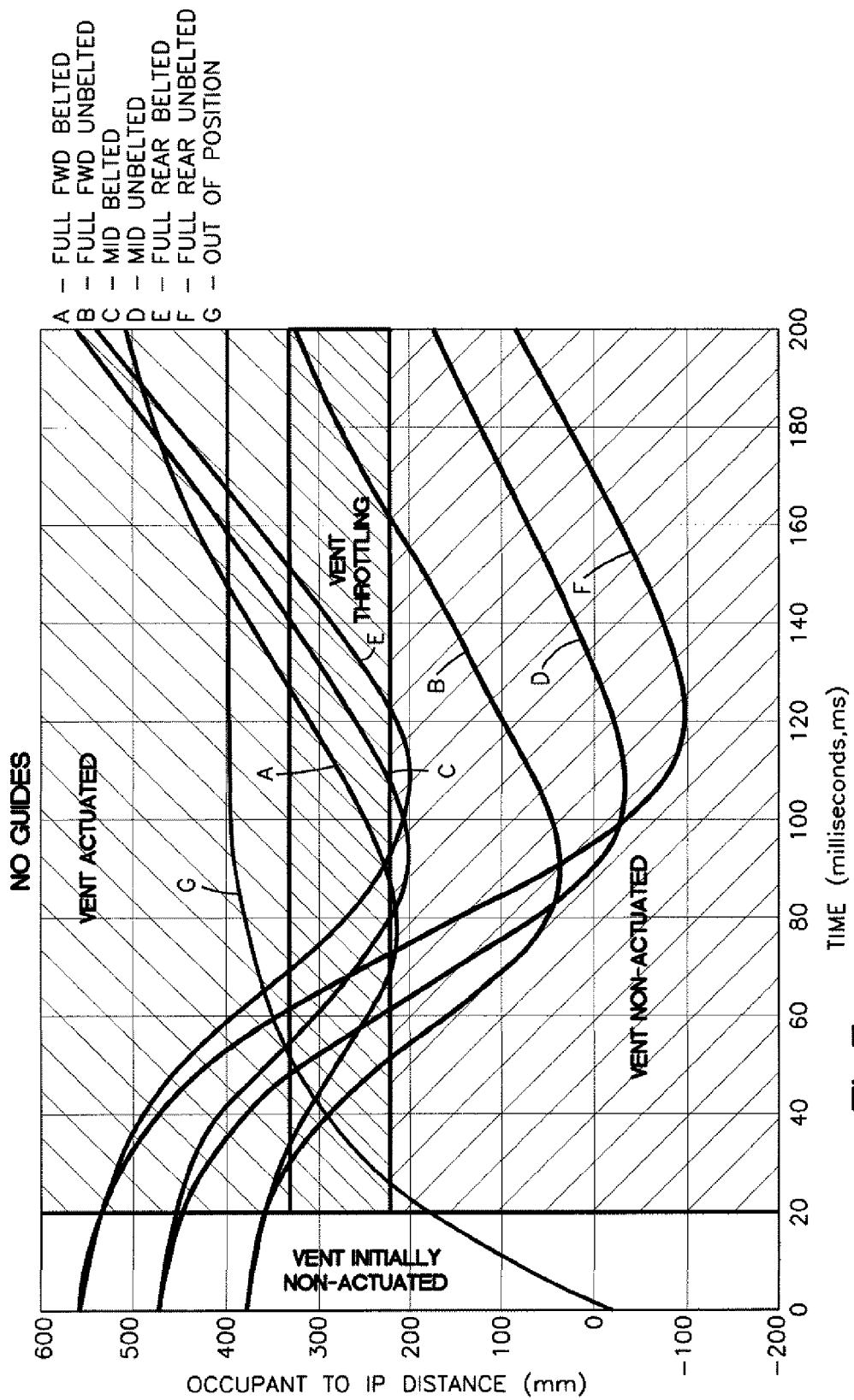
FIG. 7 is a chart illustrating certain occupant characteristics under different vehicle operating conditions and corresponding vent conditions associated with the vent configuration of FIGS. 6A-6C.

According to the invention, the apparatus 10a has several configurable features that help provide the multi-phase adaptive venting functionality. FIG. 7 illustrates the multi-phase adaptive venting functionality of the apparatus 10a of FIGS. 6A-6C, which features no guides and a single segment tether 150a. The chart of FIG. 7 illustrates occupant penetration in terms of occupant chest to instrument panel (IP) distance versus time, where time=0 at the start of the impact event that triggers deployment of the air bag 14a. The various regions of the chart, which are bounded by bold lines, indicate the various vent conditions which, once the air bag 14a is deployed, depend on the occupant chest to UP distance. At time=0, the vent 160a is in the non-actuated condition. Uninhibited, the vent 160a is configured to transition to the actuated condition by time=20 ms. FIG. 7 illustrates how the apparatus 10a of the present invention is configured between the three phases/conditions of vent actuation—non-actuated, actuated, and throttling—in response to the vehicle and occupant conditions that are gauged in terms of occupant penetration, i.e., chest to instrument panel (IP) distance.

The chart of FIG. 7 and the regions depicted thereon thus are specific to the configuration illustrated in FIGS. 6A-6C. Thus, as shown in FIG. 7, once the air bag 14a is deployed, occupant penetration (i.e., chest to IP distance) from 600 mm to approximately 330 mm will not affect the vent 160a, and the vent will remain in the actuated condition. Occupant penetration from approximately 330 mm to approximately 220 mm will throttle the vent 160a from the actuated condition toward the non-actuated condition. Once occupant penetration reaches approximately 220 mm, the vent 160a reaches the non-actuated condition and remains in the non-actuated condition as long as the occupant penetration is approximately 220 mm or less.

The various lines labeled A through G in FIG. 7 illustrate the operation of the apparatus 10a in response to varying vehicle and occupant conditions at the time of deployment of the air bag 14a of FIGS. 6A-6C. The line identified at A in FIG. 7 corresponds to a belted occupant 20a with a full forward seat position that produces an initial chest to IP distance (see FIG. 6A) of approximately 380 mm. This would correspond to a belted 5% female occupant. As shown in FIG. 7, the apparatus 10a is configured to respond to the full forward belted occupant with the vent 160a transitioning quickly to the throttling condition (i.e., within about 15 ms, at time≈35 ms, see FIG. 6B). The vent 160a throttles and reaches the non-actuated condition within about 35 ms, at time≈70 ms). The occupant penetrates into the air bag 14a, reaching maximum penetration of about 220 mm chest to IP at time≈75 ms (see FIG. 6C). The occupant 20a then rebounds and the vent 160a throttles at time≈90 ms back to the actuated condition at time≈125 ms. If there is sufficient pressure in the air bag 14a, the vent 160a may throttle back to the actuated condition. Any further impacts with the air bag 14a would thus occur with the vent 160a in the actuated condition, and any further ride-down would proceed with the vent throttling to the non-actuated condition at the penetration values dictated by the configuration of the apparatus 10a (i.e., throttling at≈330 mm chest to IP, and non-actuated at≈220 mm).

The line identified at B in FIG. 7 corresponds to an unbelted occupant 20a with a full forward seat position that produces an initial chest to IP distance of approximately 380 mm. This would correspond to an unbelted 5% female occupant. As shown in FIG. 7, the apparatus 10a is configured to respond to the full forward unbelted occupant with the vent 160a transitioning quickly to the throttling condition (i.e., within about 10 ms, at time≈30 ms). The vent 160a throttles and reaches the non-actuated condition within about 20 ms, at time≈50 ms). The occupant penetrates into the air bag 14a, reaching maximum penetration of about 40 mm chest to IP at time≈90 ms. The occupant 20a then rebounds and the vent 160a throttles at time≈160 ms back toward the actuated condition at time≈200 ms. If there is sufficient pressure in the air bag 14a, the vent 160a may throttle back to the actuated condition.

The line identified at C in FIG. 7 corresponds to a belted occupant 20a with a mid seat position between full forward and full rearward that produces an initial chest to IP distance (see FIG. 6A) of approximately 470 mm. This would correspond to a belted 50% male occupant. As shown in FIG. 7, the apparatus 10a is configured to respond to the mid positioned belted occupant with the vent 160a transitioning to the throttling condition (i.e., within about 35 ms, at time≈55 ms, see FIG. 6B). The vent 160a throttles and reaches the non-actuated condition within about 25 ms, at time≈80 ms). The occupant penetrates into the air bag 14a, reaching maximum penetration of about 200 mm chest to IP at time≈90 ms (see FIG. 6C). The occupant 20a then rebounds and the vent 160a throttles at time≈110 ms back to the actuated condition at time≈140 ms. If there is sufficient pressure in the air bag 14a, the vent 160a may throttle back to the actuated condition. Any further impacts with the air bag 14a would thus occur with the vent 160a in the actuated condition, and any further ride-down would proceed with the vent throttling to the non-actuated condition at the penetration values dictated by the configuration of the apparatus 10a (i.e., throttling at≈330 mm chest to IP, and non-actuated at≈220 mm).

The line identified at D in FIG. 7 corresponds to an unbelted occupant 20a with a mid seat position between full forward and full rearward that produces an initial chest to IP distance of approximately 470 mm. This would correspond to an unbelted 50% male occupant. As shown in FIG. 7, the apparatus 10a is configured to respond to the mid positioned unbelted occupant with the vent 160a transitioning to the throttling condition (i.e., within about 30 ms, at time≈50 ms). The vent 160a throttles and reaches the non-actuated condition within about 10 ms, at time≈60 ms). The occupant penetrates into the air bag 14a, reaching maximum penetration of about −30 mm chest to IP at time≈110 ms. The −30 mm penetration is indicative of the unbelted occupant 20a impacting the instrument panel 36a. The occupant 20a then rebounds and the vent 160a throttles at time>200 ms back toward the actuated condition. If there is sufficient pressure in the air bag 14a, the vent 160a may throttle back to the actuated condition.

The line identified at E in FIG. 7 corresponds to a belted occupant 20a with a full rearward seat position that produces an initial chest to IP distance (see FIG. 6A) of approximately 560 mm. This would correspond to a belted 50% male occupant. As shown in FIG. 7, the apparatus 10a is configured to respond to the mid positioned belted occupant with the vent 160a transitioning to the throttling condition (i.e., within about 50 ms, at time≈70 ms, see FIG. 6B). The vent 160a throttles and reaches the non-actuated condition within about 20 ms, at time≈90 ms). The occupant penetrates into the air bag 14a, reaching maximum penetration of about 200 mm chest to IP at time≈110 ms (see FIG. 6C). The occupant 20a then rebounds and the vent 160a throttles at time≈125 ms back to the actuated condition at time≈150 ms. If there is sufficient pressure in the air bag 14a, the vent 160a may throttle back to the actuated condition. Any further impacts with the air bag 14a would thus occur with the vent 160a in the actuated condition, and any further ride-down would proceed with the vent throttling to the non-actuated condition at the penetration values dictated by the configuration of the apparatus 10a (i.e., throttling at≈330 mm chest to IP, and non-actuated at≈220 mm).

The line identified at F in FIG. 7 corresponds to an unbelted occupant 20a with a full rearward seat position that produces an initial chest to IP distance of approximately 560 mm. This would correspond to an unbelted 50% male occupant. As shown in FIG. 7, the apparatus 10a is configured to respond to the rear positioned unbelted occupant with the vent 160a transitioning to the throttling condition (i.e., within about 40 ms, at time≈60 ms). The vent 160a throttles and reaches the non-actuated condition within about 10 ms, at time≈75 ms). The occupant penetrates into the air bag 14a, reaching maximum penetration of about −100 mm chest to IP at time≈120 ms. The −100 mm penetration is indicative of the unbelted occupant 20a impacting the instrument panel 36a. The occupant 20a then rebounds and the vent 160a throttles at time>200 ms back toward the actuated condition. If there is sufficient pressure in the air bag 14a the vent 160a may throttle back to the actuated condition.

The line identified at G in FIG. 7 corresponds to an occupant 20a leaning forward against the instrument panel 36a at time=0. As shown in FIG. 7, the apparatus 10a responds to the out of position occupant with the vent 160a remaining in the non-actuated condition from time=0 through time≈25 ms due to the out of position occupant inhibiting air bag deployment. At time≈25 ms, the vent 160a throttles due to air bag deployment and the occupant moving away from the instrument panel 36a. At time≈50 ms, the vent 160a reaches the actuated condition and remains in this condition beyond time=200 ms. Any further impacts with the air bag 14a would thus occur with the vent 160a in the actuated condition, and any further ride-down would proceed with the vent throttling to the non-actuated condition at the penetration values dictated by the configuration of the apparatus 10a (i.e., throttling at≈330 mm chest to IP, and non-actuated at ≈220 mm).

The comparative examples of FIGS. 4A-5 and FIGS. 6A-7 illustrate how the configuration of the apparatus 10 and 10a, respectively can affect the functionality of the vent 160, 160a. By removing the guide from the embodiment of FIGS. 4A-4C, the degree of penetration required to throttle the vent 160, 160a from the actuated condition to the non-actuated condition, and the range of penetration through which this throttling occurs, is effectively doubled. The effective area of the vent apertures in the vent 160, 160a determines the volumetric flow rate of inflation fluid venting per unit throttling/penetration distance. Thus, by adding/removing guides, by changing the angle between tether segments in a configuration that includes one or more guides, or through the construction of the vent itself, the throttling effect on venting can be tailored. This tailoring includes adjusting when the vent throttling begins and ends, the amount of penetration required to begin throttling, the amount of penetration required to completely throttle the vent, and the rate at which inflation fluid flows through the vent during throttling.

Viewing FIGS. 5 and 7, the apparatus 10, 10a of the present invention is configured for multi-phase operation. Left uninhibited during deployment, the vent 160, 160a is initially non-actuated and transitions to the actuated condition upon reaching a predetermined point during deployment. Thereafter, the vent 160, 160a is responsive to vehicle and occupant conditions, and can throttle between the actuated and non-actuated conditions depending on occupant penetration.

Advantageously, the vent, being configured to assume the non-actuated condition under the influence of inflation fluid pressure, is initially non-actuated. Thus, by selecting an actuated closed vent configuration, the air bag initially will vent, which may be beneficial, for example, in a scenario where it is desirable for the initial energy of the inflating air bag to be minimized. Conversely, by selecting an actuated open vent configuration, the air bag initially will not vent, which may be beneficial, for example, in a scenario where it is desirable that the air bag inflate and pressurize as rapidly as possible. If the vent does not assume the non-actuated condition under the influence of inflation fluid pressure in the air bag, this multiphase operation cannot be achieved.

An additional advantage lies in the fact that by sizing the vent and by configuring the tether and any included guide(s), the amount of venting that occurs during throttling and the range of penetration over which throttling occurs can also be tailored. For example, a vent with a comparatively large vent opening in a guideless configuration will result in a comparatively large volumetric flow rate through the vent for a comparatively long duration. Conversely, a vent with a comparatively small vent opening in a configuration implementing one or more guides will result in a comparatively small volumetric flow rate through the vent for a comparatively short duration. Combinations of vent sizes, guide configurations, and tether length and angles can be incorporated to select the combination that yields the desired vent rate and duration over the desired degree of occupant penetration. From this, those skilled in the art will appreciate that these properties can be combined in various manners to tailor both the flow rate and the venting duration of the apparatus.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, the apparatus comprising:
   an inflatable vehicle occupant protection device inflatable between a vehicle surface and the vehicle occupant;
   a vent for releasing inflation fluid from the protection device, the vent having an actuated condition and a non-actuated condition; and
   a tether having a first connection with the vent and a second connection with the protection device, tension on the tether actuating the vent, wherein the vent is configured to be initially in the non-actuated condition upon initial deployment of the protection device, with further deployment of the protection device to a predetermined degree causing the tether to place the vent in the actuated condition, and the tether and vent being configured such that a predetermined degree of occupant penetration into the protection device causes the tether to place the vent back in the non-actuated condition, wherein the vent comprises a vent opening with a flow area that can be adjusted to throttle inflation fluid flow through the vent, tension on the tether throttling the vent.

2. The apparatus recited in claim 1, wherein the actuated condition of the vent is an open condition and the non-actuated condition of the vent is a closed condition.

3. The apparatus recited in claim 1, wherein the actuated condition of the vent is a closed condition and the non-actuated condition of the vent is an open condition.

4. The apparatus recited in claim 1, further comprising a guide connected to the protection device, the tether extending through the guide, wherein the guide is positioned on the protection device to move with the protection device in response to occupant penetration into the protection device, and wherein this guide movement causes the tether to slide through the guide and thereby throttle the vent.

5. The apparatus recited in claim 4, wherein the guide is positioned on the protection device at a location where a particular portion of the occupant is likely to strike the protection device.

6. The apparatus recited in claim 4, wherein the proportion of occupant penetration to vent throttling can be adjusted by adjusting at least one of the position of the guide and the second connection on protection device.

7. The apparatus recited in claim 1, wherein the vent is configured such that inflation fluid pressure in the protection device biases the vent toward the non-actuated condition and the tether urges the vent toward the actuated condition against the bias of inflation fluid pressure as the protection device inflated and deploys.

8. The apparatus recited in claim 1, wherein the tether is configured such that tether movement in response to occupant penetration causes vent throttling by permitting the vent to move under the bias of inflation fluid pressure toward the non-actuated condition.

9. The apparatus recited in claim 1, wherein the throttling of the vent is in proportion to occupant penetration into the protection device.

10. The apparatus recited in claim 1, wherein the vent is configured to be placed in a closed condition in response to the protection device reaching a fully deployed condition, the tether throttling the vent toward the open condition in response to the occupant penetration.

11. The apparatus recited in claim 1, wherein the vent is configured to be placed in an open condition in response to the protection device reaching a fully deployed condition, the tether throttling the vent toward the closed condition in response to the occupant penetration.

12. The apparatus recited in claim 1, wherein the second connection comprises a guide connected to a front panel of the protection device at a location where an occupant penetration into the protection device is likely.

13. The apparatus recited in claim 1, wherein the second connection is located on a front panel of the protection device at a location where occupant penetration into the protection device is likely.

14. The apparatus recited in claim 1, wherein the tether is configured to prevent actuation of the vent in response to the protection device being inhibited from deployment.

15. An apparatus for helping to protect an occupant of a vehicle, the apparatus comprising:
   an inflatable vehicle occupant protection device inflatable between a vehicle surface and the vehicle occupant;
   a vent for releasing inflation fluid from the protection device, the vent having an actuated condition and a non-actuated condition; and
   a tether having a first connection with the vent and a second connection with the protection device, fluid pressure acting on the vent urges the vent toward the non-actuated condition and tension on the tether urges the vent toward the actuated condition, fluid pressure acting on the protection device in the region of the second connection tensions the tether, which overcomes the fluid pressure acting on the vent and places the vent in the actuated condition, wherein the vent comprises a vent opening with a flow area that can be adjusted to throttle inflation fluid flow through the vent, tension on the tether throttling the vent.

16. The apparatus recited in claim 15, wherein the tether is configured such that occupant penetration into the protection device allows the fluid pressure acting on the vent to urge the vent toward the non-actuated condition.

17. The apparatus recited in claim 15, further comprising a guide connected to the protection device, the tether extending through the guide, wherein the guide is positioned on the protection device to move with the protection device in response to occupant penetration into the protection device, and wherein this guide movement causes the tether to slide through the guide and thereby throttle the vent.

18. The apparatus recited in claim 17, wherein the guide is positioned on the protection device at a location where a particular portion of the occupant is likely to strike the protection device.

19. The apparatus recited in claim 15, wherein the throttling of the vent is in proportion to occupant penetration into the protection device.

20. The apparatus recited in claim 15, wherein the vent is configured to be placed in a closed condition in response to the protection device reaching a fully deployed condition, the tether throttling the vent toward the open condition in response to the occupant penetration.

21. The apparatus recited in claim 15, wherein the vent is configured to be placed in an open condition in response to the protection device reaching a fully deployed condition, the tether throttling the vent toward the closed condition in response to the occupant penetration.

22. The apparatus recited in claim 15, wherein the second connection comprises a guide connected to a front panel of the protection device at a location where occupant penetration into the protection device is likely.

23. The apparatus recited in claim 15, wherein the second connection is located on a front panel of the protection device at a location where occupant penetration into the protection device is likely.

24. The apparatus recited in claim 15, wherein the tether is configured to prevent actuation of the vent in response to the protection device being inhibited from deployment.

25. An apparatus for helping to protect an occupant of a vehicle, the apparatus comprising:
   an inflatable vehicle occupant protection device inflatable between a vehicle surface and the vehicle occupant;
   a vent for releasing inflation fluid from the protection device, the vent having an actuated condition and a non-actuated condition, the vent being configured to be in the non-actuated condition when the protection device deploys; and
   a tether having a first connection with the vent and a second connection with the protection device, the tether being configured to:
   prevent actuation of the vent in response to the protection device being inhibited from deployment;
   actuate the vent in response to substantial deployment of the protection device;
   throttle actuation of the vent through a range of deployment between initial deployment and substantial deployment of the protection device; and
   place the vent in the non-actuated condition in response to occupant penetration into the protection device beyond a predetermined degree.

\* \* \* \* \*